(12) United States Patent
Taniguchi et al.

(10) Patent No.: US 7,925,132 B2
(45) Date of Patent: Apr. 12, 2011

(54) NONLINEAR OPTICAL FIBER, NONLINEAR OPTICAL DEVICE, AND OPTICAL SIGNAL PROCESSING APPARATUS

(75) Inventors: Yuki Taniguchi, Tokyo (JP); Jiro Hiroishi, Tokyo (JP); Masanori Takahashi, Tokyo (JP); Ryuichi Sugizaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/488,172

(22) Filed: Jun. 19, 2009

(65) Prior Publication Data
US 2009/0257724 A1 Oct. 15, 2009

Related U.S. Application Data

(60) Division of application No. 12/195,839, filed on Aug. 21, 2008, now abandoned, which is a continuation of application No. PCT/JP2007/053098, filed on Feb. 20, 2007.

(30) Foreign Application Priority Data

Feb. 21, 2006 (JP) .................................. 2006-044495

(51) Int. Cl.
G02B 6/028 (2006.01)
G02B 6/02 (2006.01)
G02B 6/00 (2006.01)
G02B 6/036 (2006.01)
H01S 3/00 (2006.01)
H01S 3/30 (2006.01)
H04B 10/12 (2006.01)

(52) U.S. Cl. ........ 385/124; 385/122; 385/126; 385/127; 359/341.1; 372/6

(58) Field of Classification Search .................. 385/124, 385/126, 127
See application file for complete search history.

(56) References Cited

U.S. PATENT DOCUMENTS
6,671,444 B1 12/2003 Arai et al.
(Continued)

FOREIGN PATENT DOCUMENTS
JP 2002-207136 A 7/2002
(Continued)

OTHER PUBLICATIONS

Tetsuya Nakanishi, et al., "Highly nonlinear dispersion shifted fiber with reduced zero-disperson wavelength fluctation in longitudinal direction", The Institute of Electronics, Information and Communication Engineers Electronics Society, Sep. 7, 2005, p. 183, C-3-39 (Japanese Reference with partial English Translation).

(Continued)

Primary Examiner — Charlie Peng
Assistant Examiner — Robert Tavlykaev
(74) Attorney, Agent, or Firm — Oblon, Spivak, McClelland, Maier & Neustadt, L.L.P.

(57) ABSTRACT

A core includes a center core region, a core layer that is formed around the center core region and that has a refractive index lower than that of the center core region, and at least one buffer core layer that is formed between the center core region and the core layer and that has a refractive index lower than that of the center core region and higher than that of the core layer. A cladding is formed around the core layer and that has a refractive index lower than that of the center core region and higher than that of the core layer. An effective core area at a wavelength of 1550 nm is equal to or smaller than 18 $\mu m^2$.

10 Claims, 21 Drawing Sheets

U.S. PATENT DOCUMENTS

| | | | |
|---|---|---|---|
| 6,804,441 B2 | 10/2004 | Arai et al. | |
| 6,925,239 B2 | 8/2005 | Wang et al. | |
| 7,006,742 B2 | 2/2006 | Takahashi et al. | |
| 7,085,464 B2 | 8/2006 | Miyabe et al. | |
| 7,164,830 B2 * | 1/2007 | Hiroishi et al. | 385/123 |
| 7,233,727 B2 | 6/2007 | Hirano et al. | |
| 7,248,399 B2 | 7/2007 | Taniguchi et al. | |
| 7,440,167 B2 | 10/2008 | Taniguchi et al. | |
| 7,536,074 B2 | 5/2009 | Tadakuma | |
| 2002/0057880 A1 | 5/2002 | Hirano et al. | |
| 2003/0095767 A1 | 5/2003 | Hiroshi et al. | |
| 2004/0234216 A1 * | 11/2004 | Okuno et al. | 385/122 |
| 2005/0111802 A1 * | 5/2005 | Lee et al. | 385/123 |
| 2005/0163444 A1 * | 7/2005 | Miyabe et al. | 385/127 |
| 2005/0213907 A1 | 9/2005 | Hiroshi et al. | |
| 2005/0264871 A1 | 12/2005 | Takahashi et al. | |
| 2006/0034575 A1 | 2/2006 | Sako et al. | |
| 2007/0053641 A1 | 3/2007 | Hirano et al. | |
| 2008/0317418 A1 | 12/2008 | Taniguchi et al. | |
| 2009/0003786 A1 | 1/2009 | Takahashi et al. | |

FOREIGN PATENT DOCUMENTS

| | | |
|---|---|---|
| JP | 2003-114350 | 4/2003 |
| JP | 2003-177266 A | 6/2003 |
| JP | 2004-117590 A | 4/2004 |
| JP | 2005-55795 A | 3/2005 |
| JP | 2005-301009 A | 10/2005 |
| JP | EP1698920 A1 * | 9/2006 |

OTHER PUBLICATIONS

U.S. Appl. No. 12/649,388, filed Dec. 30, 2009, Takahashi, et al.

U.S. Appl. No. 12/846,113, filed Jul. 29, 2010, Takahashi, et al.

* cited by examiner

FIG.3

| d12 [μm] | WAVELENGTH DISPERSION D [ps/(km nm)] | ΔD [ps/(km nm)/%] | WAVELENGTH DISPERSION SLOPE S [ps/(km nm²)] | EFFECTIVE AREA $A_{eff}$ [μm²] | CUTOFF WAVELEGNTH $\lambda_c$ [nm] |
|---|---|---|---|---|---|
| 19.9 | -1.79 | 0.58 | 0.049 | 10.27 | 1351.7 |
| 20.0 | -1.50 | 0.57 | 0.049 | 10.31 | 1358.6 |
| 20.1 | -1.22 | 0.56 | 0.050 | 10.35 | 1365.6 |
| 20.2 | -0.94 | 0.56 | 0.050 | 10.39 | 1372.6 |
| 20.3 | -0.67 | 0.55 | 0.050 | 10.43 | 1379.5 |
| 20.4 | -0.40 | 0.54 | 0.050 | 10.47 | 1386.5 |
| 20.5 | -0.14 | 0.53 | 0.051 | 10.51 | 1393.5 |
| 20.6 | 0.12 | 0.52 | 0.051 | 10.55 | 1400.5 |
| 20.7 | 0.37 | 0.51 | 0.051 | 10.59 | 1407.4 |
| 20.8 | 0.61 | 0.51 | 0.052 | 10.63 | 1414.4 |
| 20.9 | 0.86 | 0.50 | 0.052 | 10.67 | 1421.4 |
| 21.0 | 1.09 | 0.49 | 0.052 | 10.71 | 1428.4 |
| 21.1 | 1.32 | 0.48 | 0.052 | 10.76 | 1435.4 |
| 21.2 | 1.55 | 0.48 | 0.053 | 10.80 | 1442.5 |
| 21.3 | 1.77 | 0.47 | 0.053 | 10.84 | 1449.5 |
| 21.4 | 1.99 | 0.46 | 0.053 | 10.88 | 1456.5 |

FIG.4

| d12 [μm] | WAVELENGTH DISPERSION D [ps/(km nm)] | ΔD [ps/(km nm)/%] | WAVELENGTH DISPERSION SLOPE S [ps/(km nm²)] | EFFECTIVE AREA $A_{eff}$ [μm²] | CUTOFF WAVELEGNTH $\lambda_c$ [nm] |
|---|---|---|---|---|---|
| 10.1 | -2.45 | 0.55 | 0.052 | 10.60 | 1401.5 |
| 10.2 | -1.92 | 0.53 | 0.052 | 10.68 | 1415.7 |
| 10.3 | -1.41 | 0.52 | 0.053 | 10.76 | 1430.0 |
| 10.4 | -0.92 | 0.50 | 0.053 | 10.83 | 1444.3 |
| 10.5 | -0.45 | 0.49 | 0.054 | 10.91 | 1458.7 |
| 10.6 | 0.00 | 0.47 | 0.054 | 10.99 | 1473.0 |
| 10.7 | 0.44 | 0.46 | 0.055 | 11.08 | 1487.4 |
| 10.8 | 0.86 | 0.45 | 0.055 | 11.16 | 1501.8 |
| 10.9 | 1.26 | 0.43 | 0.056 | 11.24 | 1516.2 |
| 11.0 | 1.65 | 0.42 | 0.056 | 11.32 | 1530.7 |
| 11.1 | 2.03 | 0.41 | 0.056 | 11.41 | 1545.1 |
| 11.2 | 2.39 | 0.40 | 0.057 | 11.49 | 1559.6 |

FIG.5

| d14/d11 | Ra11 | Δ11 [%] | α11 | Ra12 | Δ14 [%] | α14 | Δ12 [%] | d12 [μm] | Wavelength Dispersion D [ps/(km nm)] | ΔD₀ [ps/(km nm)/%] | Wavelength Dispersion Slope S [ps/(km nm²)] | Effective Area A_eff [μm²] | Cutoff Wavelength λc [nm] |
|---|---|---|---|---|---|---|---|---|---|---|---|---|---|
| 1.20 | 0.20 | 3.0 | 3 | 0.24 | 0.4 | 5 | -0.6 | 20.1 | 0.00 | 0.56 | 0.048 | 10.37 | 1374.4 |
| 1.25 | 0.20 | 3.0 | 3 | 0.25 | 0.4 | 5 | -0.6 | 20.2 | -0.06 | 0.53 | 0.051 | 10.52 | 1393.8 |
| 1.30 | 0.20 | 3.0 | 3 | 0.26 | 0.4 | 5 | -0.6 | 20.4 | -0.03 | 0.49 | 0.053 | 10.71 | 1420.0 |
| 1.35 | 0.20 | 3.0 | 3 | 0.27 | 0.4 | 5 | -0.6 | 20.7 | 0.08 | 0.45 | 0.055 | 10.92 | 1453.2 |
| 1.40 | 0.20 | 3.0 | 3 | 0.28 | 0.4 | 5 | -0.6 | 21.0 | 0.07 | 0.43 | 0.057 | 11.13 | 1486.5 |
| 1.32 | 0.25 | 3.0 | 3 | 0.33 | 0.4 | 5 | -0.6 | 16.4 | 0.01 | 0.47 | 0.054 | 10.78 | 1431.8 |
| 1.36 | 0.25 | 3.0 | 3 | 0.34 | 0.4 | 5 | -0.6 | 16.6 | 0.09 | 0.45 | 0.056 | 10.96 | 1459.1 |
| 1.40 | 0.25 | 3.0 | 3 | 0.35 | 0.4 | 5 | -0.6 | 16.8 | 0.09 | 0.43 | 0.057 | 11.13 | 1486.4 |
| 1.30 | 0.30 | 3.0 | 3 | 0.39 | 0.4 | 5 | -0.6 | 13.6 | -0.01 | 0.49 | 0.053 | 10.70 | 1420.1 |
| 1.33 | 0.30 | 3.0 | 3 | 0.40 | 0.4 | 5 | -0.6 | 13.7 | -0.02 | 0.47 | 0.054 | 10.83 | 1438.7 |
| 1.37 | 0.30 | 3.0 | 3 | 0.41 | 0.4 | 5 | -0.6 | 13.8 | -0.09 | 0.45 | 0.056 | 10.95 | 1457.3 |
| 1.40 | 0.30 | 3.0 | 3 | 0.42 | 0.4 | 5 | -0.6 | 14.0 | 0.10 | 0.43 | 0.057 | 11.13 | 1486.8 |
| 1.31 | 0.35 | 3.0 | 3 | 0.46 | 0.4 | 5 | -0.6 | 11.7 | -0.02 | 0.49 | 0.053 | 10.76 | 1430.1 |
| 1.34 | 0.35 | 3.0 | 3 | 0.47 | 0.4 | 5 | -0.6 | 11.8 | 0.05 | 0.47 | 0.055 | 10.89 | 1449.5 |
| 1.37 | 0.35 | 3.0 | 3 | 0.48 | 0.4 | 5 | -0.6 | 11.9 | 0.08 | 0.45 | 0.056 | 11.01 | 1469.0 |

FIG.6

| d14/d11 | Ra11 | Δ11 [%] | α11 | Ra12 | Δ14 [%] | α14 | Δ12 [%] | d12 [μm] | WAVELENGTH DISPERSION D [ps/(km nm)] | ΔD₀ [ps/(km nm)/%] | WAVELENGTH DISPERSION SLOPE S [ps/(km nm²)] | EFFECTIVE AREA $A_{eff}$ [μm²] | CUTOFF WAVELENGTH $λ_c$ [nm] |
|---|---|---|---|---|---|---|---|---|---|---|---|---|---|
| 1.20 | 0.20 | 2.4 | 4 | 0.24 | 0.4 | 5 | -0.6 | 19.1 | 0.14 | 0.66 | 0.042 | 11.43 | 1225.6 |
| 1.30 | 0.20 | 2.4 | 4 | 0.26 | 0.4 | 5 | -0.6 | 19.0 | 0.11 | 0.59 | 0.046 | 11.71 | 1243.4 |
| 1.40 | 0.20 | 2.4 | 4 | 0.28 | 0.4 | 5 | -0.6 | 19.1 | 0.11 | 0.51 | 0.051 | 12.06 | 1272.5 |
| 1.50 | 0.20 | 2.4 | 4 | 0.30 | 0.4 | 5 | -0.6 | 19.4 | 0.09 | 0.44 | 0.056 | 12.46 | 1314.3 |
| 1.60 | 0.20 | 2.4 | 4 | 0.32 | 0.4 | 5 | -0.6 | 19.9 | 0.06 | 0.39 | 0.059 | 12.91 | 1370.0 |
| 1.70 | 0.20 | 2.4 | 4 | 0.34 | 0.4 | 5 | -0.6 | 20.5 | -0.08 | 0.36 | 0.061 | 13.37 | 1433.4 |
| 1.80 | 0.20 | 2.4 | 4 | 0.36 | 0.4 | 5 | -0.6 | 21.3 | 0.04 | 0.36 | 0.061 | 13.87 | 1512.6 |
| 1.20 | 0.30 | 2.4 | 4 | 0.36 | 0.4 | 5 | -0.6 | 12.7 | -0.13 | 0.68 | 0.040 | 11.41 | 1222.2 |
| 1.30 | 0.30 | 2.4 | 4 | 0.39 | 0.4 | 5 | -0.6 | 12.7 | 0.19 | 0.60 | 0.046 | 11.73 | 1246.7 |
| 1.40 | 0.30 | 2.4 | 4 | 0.42 | 0.4 | 5 | -0.6 | 12.7 | -0.09 | 0.53 | 0.050 | 12.03 | 1269.3 |
| 1.50 | 0.30 | 2.4 | 4 | 0.45 | 0.4 | 5 | -0.6 | 12.9 | -0.06 | 0.46 | 0.055 | 12.43 | 1311.2 |
| 1.60 | 0.30 | 2.4 | 4 | 0.48 | 0.4 | 5 | -0.6 | 13.3 | 0.15 | 0.40 | 0.059 | 12.93 | 1374.1 |
| 1.70 | 0.30 | 2.4 | 4 | 0.51 | 0.4 | 5 | -0.6 | 13.7 | 0.02 | 0.37 | 0.060 | 13.39 | 1438.0 |
| 1.80 | 0.30 | 2.4 | 4 | 0.54 | 0.4 | 5 | -0.6 | 14.2 | 0.06 | 0.36 | 0.061 | 13.86 | 1514.3 |
| 1.20 | 0.40 | 2.4 | 4 | 0.48 | 0.4 | 5 | -0.6 | 9.7 | 0.29 | 0.72 | 0.038 | 11.58 | 1247.2 |
| 1.30 | 0.40 | 2.4 | 4 | 0.52 | 0.4 | 5 | -0.6 | 9.6 | -0.21 | 0.67 | 0.042 | 11.81 | 1259.8 |
| 1.40 | 0.40 | 2.4 | 4 | 0.56 | 0.4 | 5 | -0.6 | 9.7 | 0.05 | 0.58 | 0.047 | 12.20 | 1297.3 |
| 1.50 | 0.40 | 2.4 | 4 | 0.60 | 0.4 | 5 | -0.6 | 9.8 | -0.24 | 0.51 | 0.052 | 12.56 | 1334.5 |
| 1.60 | 0.40 | 2.4 | 4 | 0.64 | 0.4 | 5 | -0.6 | 10.1 | 0.04 | 0.44 | 0.056 | 13.06 | 1400.4 |
| 1.70 | 0.40 | 2.4 | 4 | 0.68 | 0.4 | 5 | -0.6 | 10.4 | -0.03 | 0.41 | 0.058 | 13.51 | 1468.3 |

FIG.7

| d14/d11 | Ra11 | $\Delta$11 [%] | $\alpha$11 | Ra12 | $\Delta$14 [%] | $\alpha$14 | $\Delta$12 [%] | d12 [μm] | WAVELENGTH DISPERSION D [ps/(km nm)] | $\Delta D_0$ [ps/(km nm)/%] | WAVELENGTH DISPERSION SLOPE S [ps/(km nm²)] | EFFECTIVE AREA $A_{eff}$ [μm²] | CUTOFF WAVELENGTH $\lambda_c$ [nm] |
|---|---|---|---|---|---|---|---|---|---|---|---|---|---|
| 1.20 | 0.20 | 1.8 | 5 | 0.24 | 0.4 | 5 | -0.6 | 18.7 | 0.06 | 0.71 | 0.038 | 13.35 | 1073.7 |
| 1.40 | 0.20 | 1.8 | 5 | 0.28 | 0.4 | 5 | -0.6 | 17.9 | 0.12 | 0.58 | 0.046 | 13.91 | 1075.5 |
| 1.60 | 0.20 | 1.8 | 5 | 0.32 | 0.4 | 5 | -0.6 | 17.5 | 0.09 | 0.44 | 0.055 | 14.65 | 1093.0 |
| 1.80 | 0.20 | 1.8 | 5 | 0.36 | 0.4 | 5 | -0.6 | 17.6 | 0.06 | 0.30 | 0.064 | 15.58 | 1138.9 |
| 2.00 | 0.20 | 1.8 | 5 | 0.40 | 0.4 | 5 | -0.6 | 18.6 | 0.00 | 0.20 | 0.071 | 16.78 | 1246.1 |
| 2.20 | 0.20 | 1.8 | 5 | 0.44 | 0.4 | 5 | -0.6 | 20.7 | -0.03 | 0.21 | 0.070 | 18.17 | 1438.8 |
| 1.20 | 0.40 | 1.8 | 5 | 0.48 | 0.4 | 5 | -0.6 | 9.7 | 0.26 | 0.85 | 0.028 | 13.75 | 1114.9 |
| 1.40 | 0.40 | 1.8 | 5 | 0.56 | 0.4 | 5 | -0.6 | 9.4 | 0.03 | 0.74 | 0.036 | 14.46 | 1132.5 |
| 1.60 | 0.40 | 1.8 | 5 | 0.64 | 0.4 | 5 | -0.6 | 9.4 | 0.23 | 0.58 | 0.046 | 15.40 | 1181.1 |
| 1.80 | 0.40 | 1.8 | 5 | 0.72 | 0.4 | 5 | -0.6 | 9.6 | -0.04 | 0.43 | 0.056 | 16.45 | 1258.0 |
| 2.00 | 0.40 | 1.8 | 5 | 0.80 | 0.4 | 5 | -0.6 | 10.2 | -0.02 | 0.33 | 0.062 | 17.66 | 1403.0 |

FIG.8

| d14/d11 | Ra11 | Δ11 [%] | α11 | Ra12 | Δ14 [%] | α14 | Δ12 [%] | d12 [μm] | WAVELENGTH DISPERSION D [ps/(km nm)] | ΔD₀ [ps/(km nm)/%] | WAVELENGTH DISPERSION SLOPE S [ps/(km nm²)] | EFFECTIVE AREA $A_{eff}$ [μm²] | CUTOFF WAVELENGTH $\lambda_c$ [nm] |
|---|---|---|---|---|---|---|---|---|---|---|---|---|---|
| 1.20 | 0.30 | 2.4 | 4 | 0.36 | 0.4 | 5 | -0.2 | 13.8 | -0.14 | 0.63 | 0.045 | 12.74 | 1387.3 |
| 1.30 | 0.30 | 2.4 | 4 | 0.39 | 0.4 | 5 | -0.2 | 13.8 | -0.17 | 0.58 | 0.048 | 12.97 | 1411.2 |
| 1.40 | 0.30 | 2.4 | 4 | 0.42 | 0.4 | 5 | -0.2 | 13.9 | -0.17 | 0.53 | 0.051 | 13.24 | 1444.8 |
| 1.50 | 0.30 | 2.4 | 4 | 0.45 | 0.4 | 5 | -0.2 | 14.1 | -0.09 | 0.49 | 0.053 | 13.55 | 1489.2 |

FIG.9

| d14/d11 | Ra11 | Δ11 [%] | α11 | Ra12 | Δ14 [%] | α14 | Δ12 [%] | d12 [μm] | WAVELENGTH DISPERSION D [ps/(km nm)] | ΔD₀ [ps/(km nm)/%] | WAVELENGTH DISPERSION SLOPE S [ps/(km nm²)] | EFFECTIVE AREA $A_{eff}$ [μm²] | CUTOFF WAVELENGTH $\lambda_c$ [nm] |
|---|---|---|---|---|---|---|---|---|---|---|---|---|---|
| 1.20 | 0.30 | 2.4 | 4 | 0.36 | 0.4 | 5 | -1.0 | 11.8 | -0.19 | 0.76 | 0.035 | 10.30 | 1112.0 |
| 1.30 | 0.30 | 2.4 | 4 | 0.39 | 0.4 | 5 | -1.0 | 11.7 | 0.10 | 0.66 | 0.041 | 10.61 | 1126.8 |
| 1.40 | 0.30 | 2.4 | 4 | 0.42 | 0.4 | 5 | -1.0 | 11.7 | 0.21 | 0.56 | 0.048 | 10.97 | 1148.8 |
| 1.50 | 0.30 | 2.4 | 4 | 0.45 | 0.4 | 5 | -1.0 | 11.8 | 0.10 | 0.46 | 0.054 | 11.38 | 1179.2 |
| 1.60 | 0.30 | 2.4 | 4 | 0.48 | 0.4 | 5 | -1.0 | 12.1 | 0.07 | 0.37 | 0.060 | 11.89 | 1229.4 |
| 1.70 | 0.30 | 2.4 | 4 | 0.51 | 0.4 | 5 | -1.0 | 12.6 | -0.02 | 0.31 | 0.064 | 12.49 | 1300.7 |
| 1.80 | 0.30 | 2.4 | 4 | 0.54 | 0.4 | 5 | -1.0 | 13.3 | -0.04 | 0.29 | 0.065 | 13.17 | 1395.1 |
| 1.90 | 0.30 | 2.4 | 4 | 0.57 | 0.4 | 5 | -1.0 | 14.0 | 0.10 | 0.30 | 0.064 | 13.76 | 1489.7 |

FIG.10

| d14/d11 | Ra11 | Δ11 [%] | α11 | Ra12 | Δ14 [%] | α14 | Δ12 [%] | d12 [μm] | WAVELENGTH DISPERSION D [ps/(km nm)] | ΔD₀ [ps/(km nm)/%] | WAVELENGTH DISPERSION SLOPE S [ps/(km nm²)] | EFFECTIVE AREA A_eff [μm²] | CUTOFF WAVELEGNTH λ_c [nm] |
|---|---|---|---|---|---|---|---|---|---|---|---|---|---|
| 1.20 | 0.20 | 3.0 | 3 | 0.24 | 0.1 | 5 | -0.6 | 21.0 | 0.06 | 0.57 | 0.048 | 10.36 | 1376.6 |
| 1.20 | 0.20 | 3.0 | 3 | 0.24 | 0.2 | 5 | -0.6 | 20.7 | -0.01 | 0.57 | 0.048 | 10.36 | 1376.0 |
| 1.20 | 0.20 | 3.0 | 3 | 0.24 | 0.3 | 5 | -0.6 | 20.4 | -0.03 | 0.56 | 0.048 | 10.37 | 1375.2 |
| 1.20 | 0.20 | 3.0 | 3 | 0.24 | 0.4 | 5 | -0.6 | 20.1 | 0.00 | 0.56 | 0.048 | 10.37 | 1374.4 |
| 1.20 | 0.20 | 3.0 | 3 | 0.24 | 0.5 | 5 | -0.6 | 19.8 | 0.05 | 0.56 | 0.048 | 10.37 | 1373.3 |
| 1.20 | 0.20 | 3.0 | 3 | 0.24 | 0.6 | 5 | -0.6 | 19.5 | 0.14 | 0.56 | 0.048 | 10.36 | 1372.0 |
| 1.40 | 0.20 | 3.0 | 3 | 0.28 | 0.1 | 5 | -0.6 | 21.8 | 0.11 | 0.49 | 0.054 | 10.90 | 1459.2 |
| 1.40 | 0.20 | 3.0 | 3 | 0.28 | 0.2 | 5 | -0.6 | 21.5 | -0.08 | 0.47 | 0.055 | 10.96 | 1465.5 |
| 1.40 | 0.20 | 3.0 | 3 | 0.28 | 0.3 | 5 | -0.6 | 21.3 | 0.05 | 0.45 | 0.056 | 11.06 | 1479.4 |
| 1.40 | 0.20 | 3.0 | 3 | 0.28 | 0.4 | 5 | -0.6 | 21.0 | 0.07 | 0.43 | 0.057 | 11.13 | 1486.5 |
| 1.40 | 0.20 | 3.0 | 3 | 0.28 | 0.5 | 5 | -0.6 | 20.6 | 0.01 | 0.41 | 0.058 | 11.15 | 1486.2 |
| 1.40 | 0.20 | 3.0 | 3 | 0.28 | 0.6 | 5 | -0.6 | 20.2 | 0.06 | 0.40 | 0.059 | 11.18 | 1485.7 |

FIG.12

| $d12'$ [μm] | WAVELENGTH DISPERSION D [ps/(km nm)] | ΔD [ps/(km nm)/%] | WAVELENGTH DISPERSION SLOPE S [ps/(km nm²)] | EFFECTIVE AREA $A_{eff}$ [μm²] | CUTOFF WAVELEGNTH $\lambda_c$ [nm] |
|---|---|---|---|---|---|
| 20.6 | -1.81 | 0.74 | 0.039 | 9.77 | 1299.6 |
| 20.7 | -1.46 | 0.73 | 0.039 | 9.81 | 1306.0 |
| 20.8 | -1.11 | 0.72 | 0.040 | 9.85 | 1312.5 |
| 20.9 | -0.77 | 0.70 | 0.040 | 9.89 | 1318.9 |
| 21.0 | -0.43 | 0.69 | 0.040 | 9.93 | 1325.4 |
| 21.1 | -0.11 | 0.68 | 0.041 | 9.97 | 1331.8 |
| 21.2 | 0.21 | 0.67 | 0.041 | 10.01 | 1338.3 |
| 21.3 | 0.53 | 0.66 | 0.042 | 10.05 | 1344.7 |
| 21.4 | 0.83 | 0.65 | 0.042 | 10.09 | 1351.2 |
| 21.5 | 1.13 | 0.64 | 0.042 | 10.13 | 1357.7 |
| 21.6 | 1.43 | 0.63 | 0.043 | 10.17 | 1364.1 |
| 21.7 | 1.72 | 0.62 | 0.043 | 10.21 | 1370.6 |

FIG.13

| $d12'$ [μm] | WAVELENGTH DISPERSION D [ps/(km nm)] | ΔD [ps/(km nm)/%] | WAVELENGTH DISPERSION SLOPE S [ps/(km nm²)] | EFFECTIVE AREA $A_{eff}$ [μm²] | CUTOFF WAVELEGNTH $\lambda_c$ [nm] |
|---|---|---|---|---|---|
| 10.2 | -2.85 | 0.80 | 0.036 | 9.69 | 1287.4 |
| 10.3 | -2.08 | 0.77 | 0.037 | 9.77 | 1300.2 |
| 10.4 | -1.35 | 0.75 | 0.038 | 9.84 | 1313.1 |
| 10.5 | -0.65 | 0.72 | 0.039 | 9.92 | 1326.0 |
| 10.6 | 0.02 | 0.70 | 0.040 | 10.00 | 1338.9 |
| 10.7 | 0.67 | 0.67 | 0.041 | 10.08 | 1351.8 |
| 10.8 | 1.28 | 0.65 | 0.042 | 10.16 | 1364.8 |
| 10.9 | 1.87 | 0.63 | 0.042 | 10.24 | 1377.8 |
| 11.0 | 2.44 | 0.61 | 0.043 | 10.32 | 1390.8 |
| 11.1 | 2.98 | 0.59 | 0.044 | 10.40 | 1403.8 |

FIG.14

| PARAMETER | 101 | 102 | 103 | 104 | 105 | 106 |
|---|---|---|---|---|---|---|
| WAVELENGTH DISPERSION [ps/nm/km] | -0.37 | -0.65 | 0.03 | -0.35 | -0.69 | -1.07 |
| DISPERSION SLOPE [ps/nm²/km] | 0.040 | 0.040 | 0.041 | 0.041 | 0.040 | 0.039 |
| ZERO DISPERSION WAVELENGTH $\lambda_0$ [nm] | 1559 | 1567 | 1549 | 1559 | 1568 | 1.578 |
| LOSS [dB/km] | 0.82 | 0.84 | 0.64 | 0.64 | 0.65 | 0.66 |
| EFFECTIVE CORE AREA $A_{eff}$ [$\mu m^2$] | 10.8 | 10.7 | 10.8 | 10.8 | 10.7 | 10.6 |
| NONLINEAR COEFFICIENT $n_2/A_{eff}$ [$10^{-10}$ W$^{-1}$] | 50 | 51 | 50 | 50 | 51 | 51 |
| CUTOFF WAVELEGNTH $\lambda_c$ [nm] | 1381 | 1371 | 1389 | 1380 | 1372 | 1363 |
| POLARIZATION MODE DISPERSION [ps/km$^{1/2}$] | 0.16 | 0.14 | 0.14 | 0.12 | 0.11 | 0.10 |
| OUTER DIAMETER OF CORE LAYER d12 [$\mu m$] | 17.8 | 17.7 | 17.9 | 17.8 | 17.7 | 17.6 |
| OUTER DIAMETER OF CLADDING [$\mu m$] | 120.8 | 120.3 | 61.0 | 60.7 | 60.4 | 60.0 |
| OUTER DIAMETER OF COATING [$\mu m$] | 242 | 243 | 131 | 131 | 131 | 131 |

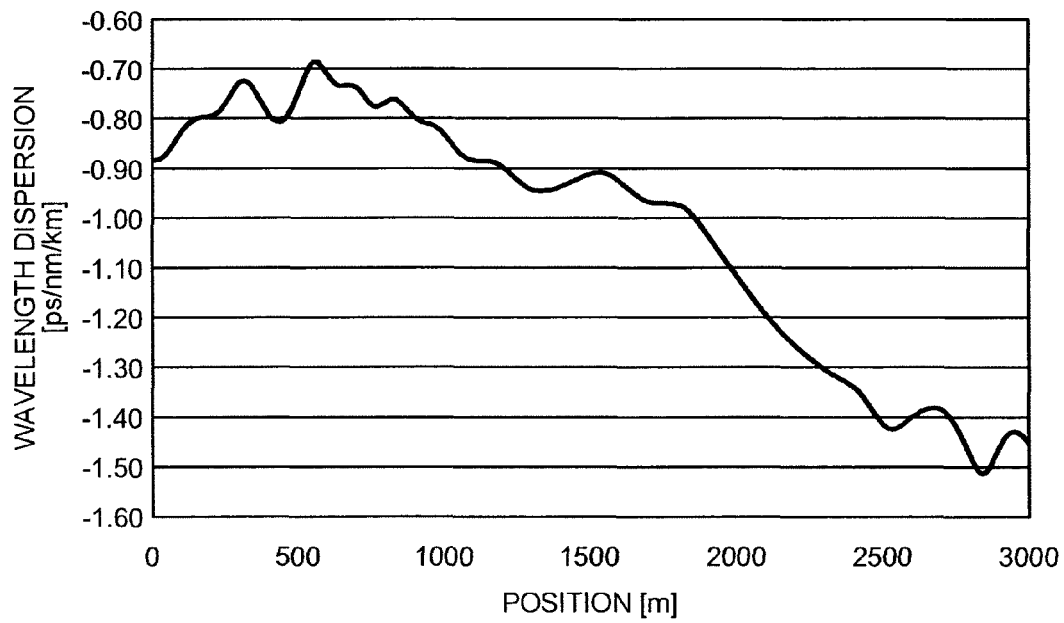

| d22 [μm] | WAVELENGTH DISPERSION D [ps/(km nm)] | ΔD [ps/(km nm)/%] | WAVELENGTH DISPERSION SLOPE S [ps/(km nm²)] | EFFECTIVE AREA $A_{eff}$ [μm²] | CUTOFF WAVELEGNTH $\lambda_c$ [nm] |
|---|---|---|---|---|---|
| 19.5 | -1.95 | 0.59 | 0.048 | 10.21 | 1341.2 |
| 19.6 | -1.64 | 0.59 | 0.048 | 10.25 | 1348.2 |
| 19.7 | -1.35 | 0.58 | 0.049 | 10.29 | 1355.3 |
| 19.8 | -1.06 | 0.57 | 0.049 | 10.33 | 1362.3 |
| 19.9 | -0.78 | 0.56 | 0.049 | 10.37 | 1369.4 |
| 20.0 | -0.50 | 0.55 | 0.050 | 10.41 | 1376.4 |
| 20.1 | -0.23 | 0.54 | 0.050 | 10.45 | 1383.5 |
| 20.2 | 0.04 | 0.53 | 0.050 | 10.49 | 1390.6 |
| 20.3 | 0.30 | 0.52 | 0.051 | 10.53 | 1397.6 |
| 20.4 | 0.55 | 0.52 | 0.051 | 10.58 | 1404.7 |
| 20.5 | 0.80 | 0.51 | 0.051 | 10.62 | 1411.8 |
| 20.6 | 1.05 | 0.50 | 0.052 | 10.66 | 1418.9 |
| 20.7 | 1.29 | 0.49 | 0.052 | 10.70 | 1426.0 |
| 20.8 | 1.52 | 0.48 | 0.052 | 10.74 | 1433.1 |
| 20.9 | 1.75 | 0.48 | 0.052 | 10.79 | 1440.2 |
| 21.0 | 1.98 | 0.47 | 0.053 | 10.83 | 1447.3 |

FIG.20

| d22 [μm] | WAVELENGTH DISPERSION D [ps/(km nm)] | ΔD [ps/(km nm)/%] | WAVELENGTH DISPERSION SLOPE S [ps/(km nm²)] | EFFECTIVE AREA $A_{eff}$ [μm²] | CUTOFF WAVELEGNTH $\lambda_c$ [nm] |
|---|---|---|---|---|---|
| 10.0 | -2.10 | 0.54 | 0.052 | 10.67 | 1413.7 |
| 10.1 | -1.57 | 0.52 | 0.052 | 10.74 | 1428.3 |
| 10.2 | -1.06 | 0.51 | 0.053 | 10.82 | 1442.9 |
| 10.3 | -0.58 | 0.49 | 0.054 | 10.90 | 1457.5 |
| 10.4 | -0.11 | 0.48 | 0.054 | 10.99 | 1472.1 |
| 10.5 | 0.34 | 0.46 | 0.055 | 11.07 | 1486.8 |
| 10.6 | 0.77 | 0.45 | 0.055 | 11.15 | 1501.5 |
| 10.7 | 1.18 | 0.43 | 0.056 | 11.24 | 1516.2 |
| 10.8 | 1.58 | 0.42 | 0.056 | 11.32 | 1530.9 |
| 10.9 | 1.96 | 0.41 | 0.057 | 11.41 | 1545.7 |

PRIOR ART    FIG.21

| d22' [μm] | WAVELENGTH DISPERSION D [ps/(km nm)] | ΔD [ps/(km nm)/%] | WAVELENGTH DISPERSION SLOPE S [ps/(km nm²)] | EFFECTIVE AREA $A_{eff}$ [μm²] | CUTOFF WAVELEGNTH $\lambda_c$ [nm] |
|---|---|---|---|---|---|
| 20.6 | -1.87 | 0.74 | 0.038 | 9.76 | 1298.3 |
| 20.7 | -1.51 | 0.73 | 0.039 | 9.80 | 1304.7 |
| 20.8 | -1.16 | 0.72 | 0.039 | 9.84 | 1311.1 |
| 20.9 | -0.82 | 0.71 | 0.040 | 9.88 | 1317.6 |
| 21.0 | -0.49 | 0.70 | 0.040 | 9.92 | 1324.0 |
| 21.1 | -0.16 | 0.69 | 0.041 | 9.95 | 1330.4 |
| 21.2 | 0.16 | 0.68 | 0.041 | 9.99 | 1336.9 |
| 21.3 | 0.48 | 0.66 | 0.041 | 10.03 | 1343.3 |
| 21.4 | 0.79 | 0.65 | 0.042 | 10.07 | 1349.8 |
| 21.5 | 1.09 | 0.64 | 0.042 | 10.11 | 1356.3 |
| 21.6 | 1.39 | 0.63 | 0.043 | 10.15 | 1362.7 |
| 21.7 | 1.68 | 0.62 | 0.043 | 10.19 | 1369.2 |
| 21.8 | 1.96 | 0.61 | 0.043 | 10.23 | 1375.7 |

FIG.23

| d22' [$\mu$m] | WAVELENGTH DISPERSION D [ps/(km nm)] | ΔD [ps/(km nm)/%] | WAVELENGTH DISPERSION SLOPE S [ps/(km nm²)] | EFFECTIVE AREA $A_{eff}$ [$\mu$m²] | CUTOFF WAVELEGNTH $\lambda_c$ [nm] |
|---|---|---|---|---|---|
| 10.3 | -2.25 | 0.79 | 0.036 | 9.75 | 1299.5 |
| 10.4 | -1.50 | 0.76 | 0.037 | 9.83 | 1312.4 |
| 10.5 | -0.78 | 0.74 | 0.038 | 9.90 | 1325.3 |
| 10.6 | -0.10 | 0.71 | 0.039 | 9.98 | 1338.2 |
| 10.7 | 0.56 | 0.69 | 0.040 | 10.06 | 1351.1 |
| 10.8 | 1.18 | 0.66 | 0.041 | 10.14 | 1364.1 |
| 10.9 | 1.78 | 0.64 | 0.042 | 10.22 | 1377.0 |
| 11.0 | 2.36 | 0.62 | 0.043 | 10.30 | 1390.0 |

FIG.24

| PARAMETER | 201 | 202 | 203 |
|---|---|---|---|
| WAVELENGTH DISPERSION [ps/nm/km] | 0.74 | -0.04 | -0.49 |
| DISPERSION SLOPE [ps/nm²/km] | 0.041 | 0.041 | 0.041 |
| ZERO DISPERSION WAVELENGTH $\lambda_0$ [nm] | 1532 | 1551 | 1562 |
| LOSS [dB/km] | 0.75 | 0.76 | 0.77 |
| EFFECTIVE CORE AREA $A_{eff}$ [$\mu$m²] | 10.9 | 10.8 | 10.7 |
| NONLINEAR COEFFICIENT $n_2/A_{eff}$ [$10^{-10}$ W$^{-1}$] | 51 | 51 | 52 |
| CUTOFF WAVELEGNTH $\lambda_c$ [nm] | 1359 | 1352 | 1347 |
| POLARIZATION MODE DISPERSION [ps/km$^{1/2}$] | 0.04 | 0.05 | 0.06 |
| OUTER DIAMETER OF CORE LAYER d22 [$\mu$m] | 19.0 | 18.7 | 18.5 |
| OUTER DIAMETER OF CLADDING [$\mu$m] | 125.0 | 123.5 | 123.0 |
| OUTER DIAMETER OF COATING [$\mu$m] | 242 | 244 | 244 |

FIG.29

| PARAMETER | 301 | 302 | 303 |
|---|---|---|---|
| WAVELENGTH DISPERSION [ps/nm/km] | 0.29 | 0.07 | -0.33 |
| DISPERSION SLOPE [ps/nm²/km] | 0.037 | 0.036 | 0.035 |
| ZERO DISPERSION WAVELENGTH $\lambda_0$ [nm] | 1542 | 1548 | 1560 |
| LOSS [dB/km] | 1.16 | 1.17 | 1.19 |
| EFFECTIVE CORE AREA $A_{eff}$ [$\mu m^2$] | 11.2 | 11.2 | 11.2 |
| NONLINEAR COEFFICIENT $n_2/A_{eff}$ [$10^{-10}$ $W^{-1}$] | 46 | 46 | 46 |
| CUTOFF WAVELEGNTH $\lambda_c$ [nm] | 1442 | 1434 | 1389 |
| CROSSTALK [dB] | 35 | 32 | 32 |
| OUTER DIAMETER OF CORE LAYER d32 [$\mu$m] | 10.7 | 10.7 | 10.6 |
| INTERVAL r OF STRESS APPLYING PREFORM [$\mu$m] | 18 | 18 | 18 |
| DIAMETER R OF STRESS APPLYING PREFORM [$\mu$m] | 34 | 34 | 34 |
| OUTER DIAMETER OF CLADDING [$\mu$m] | 126 | 125 | 124 |
| OUTER DIAMETER OF COATING [$\mu$m] | 245 | 245 | 244 |

FIG.30

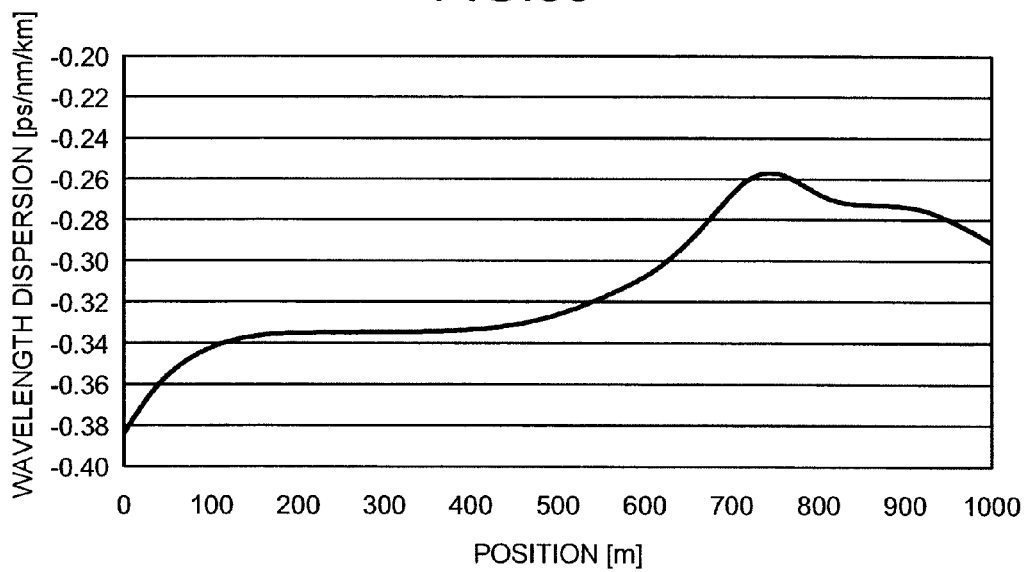

NONLINEAR OPTICAL FIBER, NONLINEAR OPTICAL DEVICE, AND OPTICAL SIGNAL PROCESSING APPARATUS

CROSS-REFERENCE TO RELATED APPLICATIONS

This application is a divisional application of U.S. patent application Ser. No. 12/195,839, filed on Aug. 21, 2008, which is a continuation of PCT/JP2007/053098 filed on Feb. 20, 2007, the entire contents of which are incorporated herein by reference.

BACKGROUND OF THE INVENTION

1. Field of the Invention

The present invention relates to a nonlinear optical fiber, a nonlinear optical device employing the nonlinear optical fiber, and an optical processing apparatus employing the nonlinear optical fiber.

2. Description of the Related Art

In recent years, with an increase of the Internet traffic, a further increase of the speed and the capacity of the information communication using an optical fiber communication system has been highly demanded. In order to realize the high speed and the large capacity of the information communication, it is required to increase the speed of the optical signal processing technology and to broaden the bandwidth of the optical amplification technology, which is used in the optical fiber communication system.

As a conventional optical signal processing technology, it is common to convert an optical signal into an electrical signal, perform a signal processing on the electrical signal that is converted from the optical signal with an electrical device, and convert the electrical signal on which the signal processing is performed back into the optical signal. In this method, because the optical signal has to be once converted into the electrical signal, the speed of the signal processing is limited by a response speed of the electrical device. However, considering the recently demanded signal processing speed, the response speed of the conventional electrical device is reaching the end of its capability.

At the same time, a lot of attention is paid to an all-optical signal processing technology in which an optical signal is processed as it is. In the all-optical signal processing technology, the optical signal is directly processed with an optical device without being converted into an electrical signal. Because the response speed of the optical device is even higher than the response speed of the electrical device, the all-optical signal processing technology can expedite the increase of the signal processing speed.

An example of the optical device used in the all-optical signal processing technology is a nonlinear optical device that uses a nonlinear optical phenomenon occurred in an optical fiber that transmits the optical signal. The nonlinear optical device using the nonlinear optical phenomenon occurred in the optical fiber can process the optical signal in a high speed because the nonlinear optical phenomenon shown a high-speed response, and at the same time, can reduce loss of the optical signal because the optical fiber has a low transmission loss. For this reason, attention is particularly focused on the all-optical signal processing technology recently, and its application to an optical signal processing apparatus is presently being studied.

Examples of the nonlinear optical phenomenon include four-wave mixing (FWM), self-phase modulation (SPM), cross-phase modulation (XPM), stimulated Brillouin scattering (SBS), and stimulated Raman scattering (SRS). Among these nonlinear optical phenomena, the FWM is used in a wavelength converter, an optical parametric amplifier (OPA), and the like. Also, optical signal processing technologies such as a pulse compression, a waveform shaping, and the like using the SPM have already been reported (see, for example, Japanese Patent Application Laid-open Publication No. 2004-117590 and Japanese Patent Application Laid-open Publication No. 2005-301009).

In order to realize the nonlinear optical device using such nonlinear optical phenomena occurred in the optical fiber, it is essential to realize an optical fiber having a capability of generating the nonlinear optical phenomena with high efficiency, that is, a nonlinear optical fiber having high optical nonlinearity. A method of increasing the optical nonlinearity of the optical fiber is, for example, to decrease the effective core area $A_{eff}$ of the optical fiber by increasing the relative refractive index difference between the core and the cladding. Examples of the nonlinear optical fiber having high optical nonlinearity are disclosed in, for example, Japanese Patent Application Laid-open Publication No. 2002-207136 and Japanese Patent Application Laid-open Publication No. 2003-177266.

In order to use the FWM or the SPM efficiently, it is necessary to use a nonlinear optical fiber not only having high optical nonlinearity but also having stable wavelength dispersion characteristics in a direction the optical signal propagates through the optical fiber, i.e., the longitudinal direction of the optical fiber. Especially when using the FWM, it is important that the absolute value of the wavelength dispersion in the longitudinal direction of the nonlinear optical fiber should be small and stable to keep the efficiency of generating the FWM over a long distance. The wavelength dispersion characteristics of the optical fiber are mainly determined by a structure of the core and the cladding and a refractive index profile of the optical fiber.

However, in a conventional optical fiber, because the diameter of the core varies along the longitudinal direction of the optical fiber due to a fluctuation of the manufacturing conditions at the time of manufacturing the optical fiber, it is difficult to manufacture an optical fiber having stable wavelength dispersion characteristics in the longitudinal direction of the optical fiber. In particular, in nonlinear optical fibers having the refractive index profiles disclosed in Japanese Patent Application Laid-open Publication No. 2002-207136 and Japanese Patent Application Laid-open Publication No. 2003-177266, there is a large change in the wavelength dispersion with a change of the diameter of the core, although they have high optical nonlinearity. Therefore, it is difficult to manufacture a nonlinear optical fiber having stable wavelength dispersion characteristics in the longitudinal direction of the fiber with the refractive index profiles disclosed in Japanese Patent Application Laid-open Publication No. 2002-207136 and Japanese Patent Application Laid-open Publication No. 2003-177266.

SUMMARY OF THE INVENTION

It is an object of the present invention to at least partially solve the problems in the conventional technology.

According to an aspect of the present invention, there is provided a nonlinear optical fiber including a core that includes a center core region, a core layer that is formed around the center core region and that has a refractive index lower than a refractive index of the center core layer, and at least one buffer core layer that is formed between the center core region and the core layer and that has a refractive index lower than the refractive index of the center core region and higher than the refractive index of the core layer; and a cladding that is formed around the core layer and that has a refractive index lower than the refractive index of the center core region and higher than the refractive index of the core layer. An effective core area at a wavelength of 1550 nm is equal to or smaller than 18 $\mu m^2$.

Furthermore, according to another aspect of the present invention, there is provided a nonlinear optical device including an optical input unit that inputs a light; an optical output unit that outputs a light; and a nonlinear optical fiber provided between the optical input unit and the optical output unit. The nonlinear optical fiber includes a core including a center core region, a core layer that is formed around the center core region and that has a refractive index lower than a refractive index of the center core layer, and at least one buffer core layer that is formed between the center core region and the core layer and that has a refractive index lower than the refractive index of the center core region and higher than the refractive index of the core layer, and a cladding that is formed around the core layer and that has a refractive index lower than the refractive index of the center core region and higher than the refractive index of the core layer. An effective core area at a wavelength of 1550 nanometers is equal to or smaller than 18 $\mu m^2$. The nonlinear optical fiber causes a nonlinear optical phenomenon to be generated by the light input from the optical input unit and outputting a light obtained by the nonlinear optical phenomenon to the optical output unit.

Moreover, according to still another aspect of the present invention, there is provided an optical signal processing apparatus including an optical signal input unit that inputs an optical signal; an optical signal processing unit that includes a nonlinear optical fiber, and performs a signal processing of the optical signal input from the optical signal input unit by using a nonlinear optical phenomenon generated in the nonlinear optical fiber; and an optical signal output unit that outputs the optical signal that is signal processed. The nonlinear optical fiber includes a core including a center core region, a core layer that is formed around the center core region and that has a refractive index lower than a refractive index of the center core layer, and at least one buffer core layer that is formed between the center core region and the core layer and that has a refractive index lower than the refractive index of the center core region and higher than the refractive index of the core layer, and a cladding that is formed around the core layer and that has a refractive index lower than the refractive index of the center core region and higher than the refractive index of the core layer. An effective core area at a wavelength of 1550 nanometers is equal to or smaller than 18 $\mu m^2$.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table of a result of calculating wavelength dispersion change $\Delta D$, wavelength dispersion slope S, effective core area $A_{eff}$ and cutoff wavelength $\lambda_c$ when the outer diameter of a core layer is changed by 1% near a point where wavelength dispersion D is 0 ps/nm/km;

FIG. 4 is a table of a result of calculating wavelength dispersion change $\Delta D$, wavelength dispersion slope S, effective core area $A_{eff}$ and cutoff wavelength $\lambda_c$ when the outer diameter of a core layer is changed by 1% near a point where wavelength dispersion D is 0 ps/nm/km;

FIG. 5 is a table of a result of comparing values of wavelength dispersion change $\Delta D_0$ when Ra11 and Ra12 are changed with parameters other than the Ra11 and the Ra12 fixed, where $\Delta$11 is set to 3.0;

FIG. 6 is a table of a result of comparing values of wavelength dispersion change $\Delta D_0$ when Ra11 and Ra12 are changed with parameters other than the Ra11 and the Ra12 fixed, where $\Delta$11 is set to 2.4;

FIG. 7 is a table of a result of comparing values of wavelength dispersion change $\Delta D_0$ when Ra11 and Ra12 are changed with parameters other than the Ra11 and the Ra12 fixed, where A11 is set to 1.8;

FIG. 8 is a table of a result of a case where $\Delta$12 is different from that used the case shown in FIG. 6;

FIG. 9 is a table of a result of a case where $\Delta$12 is different from that used the case shown in FIG. 6;

FIG. 10 is a table of a result of a case where $\Delta$14 is changed in the case shown in FIG. 5;

FIG. 12 is a table of a result of calculating wavelength dispersion change $\Delta D$, wavelength dispersion slope S, effective core area $A_{eff}$ and cutoff wavelength $\lambda_c$ when the outer diameter of a core layer is changed by 1% near a point where wavelength dispersion D is 0 ps/nm/km;

FIG. 13 is a table of a result of calculating wavelength dispersion change $\Delta D$, wavelength dispersion slope S, effective core area $A_{eff}$ and cutoff wavelength $\lambda_c$ when the outer diameter of a core layer is changed by 1% near a point where wavelength dispersion D is 0 ps/nm/km;

FIG. 14 is a table of characteristics of nonlinear optical fibers according to embodiment examples 1 to 6 of the present invention;

FIG. 15 is a graph showing a result of measuring variation of wavelength dispersion in the longitudinal direction of the nonlinear optical fiber, where the horizontal axis represents position from a facet of the optical fiber and the vertical axis represents wavelength dispersion;

FIG. 19 is a table of a result of calculating wavelength dispersion change $\Delta D$, wavelength dispersion slope S, effective core area $A_{eff}$ and cutoff wavelength $\lambda_c$ when the outer diameter of a core layer is changed by 1% near a point where wavelength dispersion D is 0 ps/nm/km;

FIG. 20 is a table of a result of calculating wavelength dispersion change $\Delta D$, wavelength dispersion slope S, effective core area $A_{eff}$ and cutoff wavelength $\lambda_c$ when the outer diameter of a core layer is changed by 1% near a point where wavelength dispersion D is 0 ps/nm/km;

FIG. 21 is a schematic diagram of the refractive index profile of a conventional-type nonlinear optical fiber;

FIG. 23 is a table of a result of calculating wavelength dispersion change ΔD, wavelength dispersion slope S, effective core area $A_{\mathit{eff}}$, and cutoff wavelength $\lambda_c$ when the outer diameter of a core layer is changed by 1% near a point where wavelength dispersion D is 0 ps/nm/km;

FIG. 24 is a table showing characteristics of nonlinear optical fibers according to embodiment examples 7 to 9 of the present invention;

FIG. 29 is a table showing characteristics of nonlinear optical fibers according to embodiment examples 10 to 12 of the present invention;

FIG. 30 is a graph showing a result of measuring variation of wavelength dispersion in the longitudinal direction of the nonlinear optical fiber, where the horizontal axis represents position from a facet of the optical fiber and the vertical axis represents wavelength dispersion;

DETAILED DESCRIPTION OF THE PREFERRED EMBODIMENTS

Figure 1:
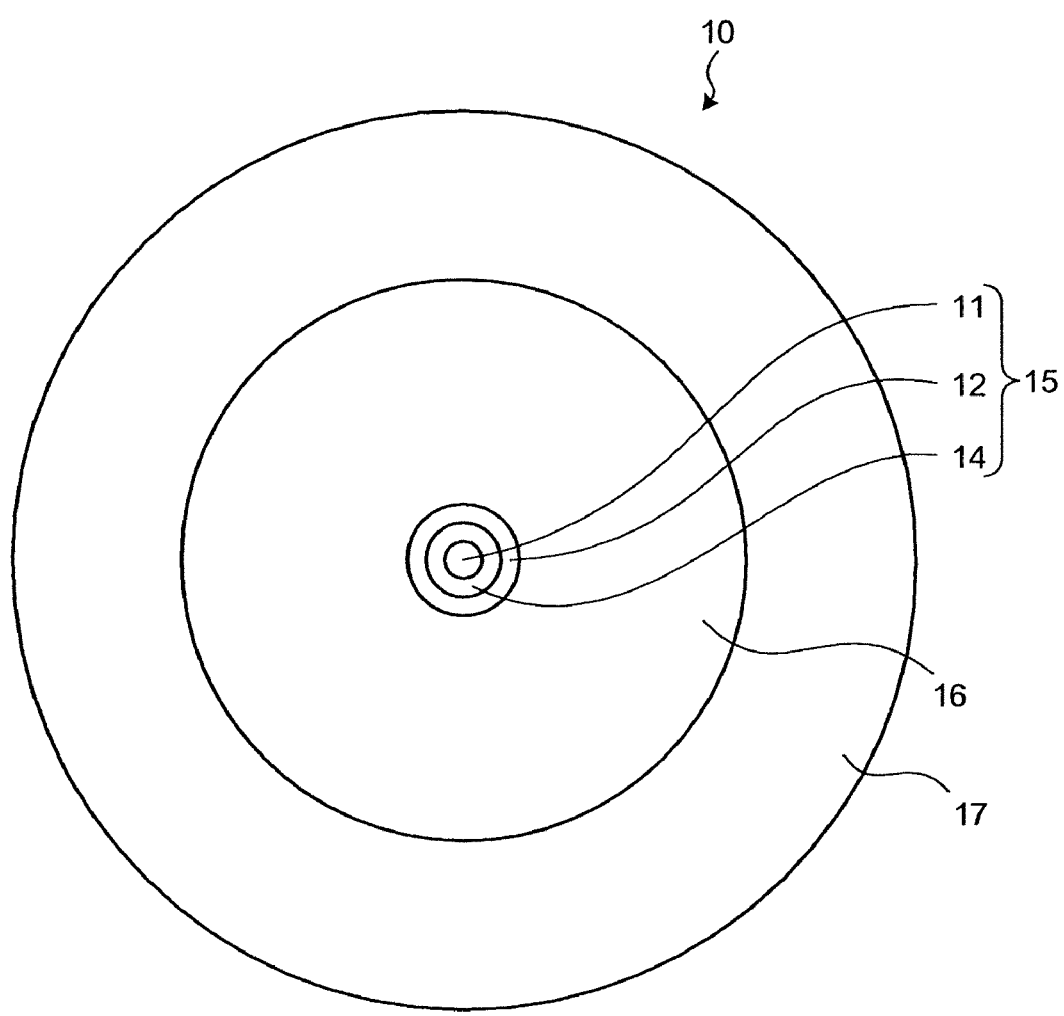
FIG. 1 is a schematic diagram of the cross section of a nonlinear optical fiber according to a first embodiment of the present invention.

Exemplary embodiments of a nonlinear optical fiber according to the present invention will be explained in detail below with reference to the accompanying drawings. In the explanation of the drawings, the same reference numerals are assigned to the same structural elements. It should be mentioned that the present invention is not to be considered limited to the embodiments.

Figure 2:
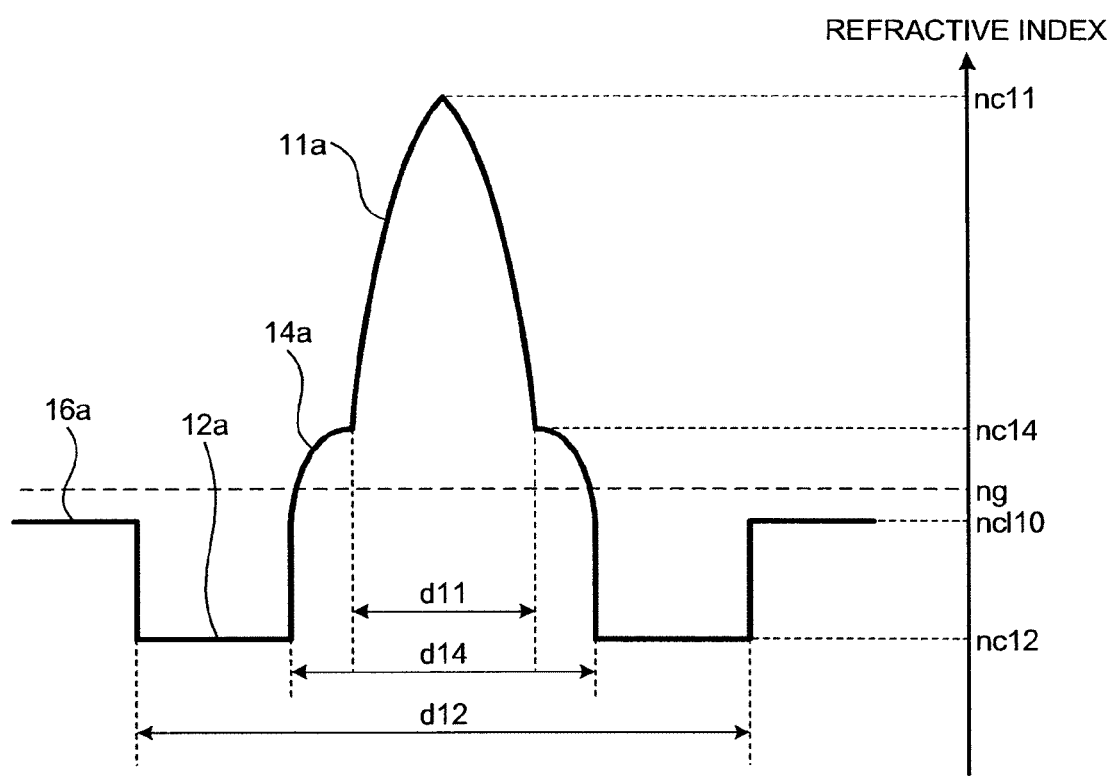
FIG. 2 is a schematic diagram of the refractive index profile of the nonlinear optical fiber according to the first embodiment of the present invention.

FIG. 1 is a schematic diagram of the cross section of a nonlinear optical fiber 10 according to the first embodiment of the present invention; and FIG. 2 is a schematic diagram of the refractive index profile of the nonlinear optical fiber 10. As shown in FIGS. 1 and 2, the nonlinear optical fiber 10 according to the first embodiment of the present invention includes a core 15 and a cladding 16. The core 15 includes a center core region 11, a core layer 12 that is formed around the center core region 11 and that has a refractive index lower than a refractive index of the center core region 11, and a buffer core layer 14 that is formed between the center core region 11 and the core layer 12 and that has a refractive index lower than the refractive index of the center core region 11 and higher than the refractive index of the core layer 12. The cladding 16 is formed around the core layer 12, having a refractive index lower than the refractive index of the center core region 11 and higher than the refractive index of the core layer 12. The effective core area at a wavelength of 1550 nm is equal to or smaller than 18 μm². The nonlinear optical fiber 10 further includes a coating 17 that is formed around the cladding 16.

The core 15 and the cladding 16 are formed with $SiO_2$ glass-based material. As for the core 15, a desired shape of the refractive index profile can be obtained by controlling a doping amount of a dopant for adjusting the refractive index, such as $GeO_2$ or F element, and a distribution of the doping amount in radial direction. At this moment, the refractive index can be increased by doping $GeO_2$, and decreased by doping F element. On the other hand, as for the cladding 16, it is formed substantially with the pure $SiO_2$ glass; however, a predetermined refractive index still can be obtained by doping a dopant for adjusting the refractive index, such as $GeO_2$ or F element. The fact that it is formed substantially with the pure $SiO_2$ glass means that a dopant for adjusting the refractive index is not contained, and some elements that does not have an influence on the refractive index, such as Cl element, can still be contained. In general, the coating 17 is formed with two-layer ultraviolet-curable resin.

The outer diameter of the cladding 16 is typically 125 μm; however, it can be reduced to equal to or smaller than 100 μm. In this case, a roll diameter can be reduced when winding the nonlinear optical fiber 10 on a bobbin and the like. The outer diameter of the coating 17 is typically 250 μm; however, it can be reduced to equal to or smaller than 150 μm by reducing the outer diameter of the cladding. In this case, the volume of the nonlinear optical fiber 10 can be reduced. Therefore, a compact-sized nonlinear optical device can be realized by winding the nonlinear optical fiber 10 on a small-diameter bobbin and packing them in a case.

As shown in FIG. 2, in the nonlinear optical fiber 10, the center core region 11 has a diameter d11, a refractive index profile 11a, and a maximum refractive index nc11. The core layer 12 has an outer diameter d12, a refractive index profile 12a, and a minimum refractive index nc12. The buffer core layer 14 has an outer diameter d14, a refractive index profile 14a, and a maximum refractive index nc14. The cladding 16 has a refractive index profile 16a and a refractive index nc110. In this figure, ng is the refractive index of the pure $SiO_2$ glass.

The profile parameters characterizing the refractive index profile of the nonlinear optical fiber 10 will be defined. Firstly, a ratio d11/d12 of the diameter d11 of the center core region 11 to the outer diameter d12 of the core layer 12 is defined as Ra11, and a ratio d14/d12 of the diameter d14 of the buffer core layer 14 to the outer diameter d12 of the core layer 12 is defined as Ra12. Secondly, the maximum relative refractive index difference between the center core region 11 and the cladding 16 is defined as Δ11, the minimum relative refractive index difference between the core layer 12 and the cladding 16 is defined as Δ12, and the maximum relative refractive index difference between the buffer core layer 14 and the cladding 16 is defined as Δ14. The maximum relative refractive index difference of the cladding with respect to the refractive index of the substantially pure $SiO_2$ glass is defined as Δclad. If the cladding is formed substantially with the $SiO_2$ glass, Δclad is 0%. In the specification, Δ11, Δ12, Δ14, and Δclad are defined by Equations (1) to (4).

$$\Delta 11 = [(nc11 - ncl10)/nc11] \times 100 \; (\%) \quad (1)$$

$$\Delta 12 = [(nc12 - ncl10)/nc12] \times 100 \; (\%) \quad (2)$$

$$\Delta 14 = [(nc14 - ncl10)/nc14] \times 100 \; (\%) \quad (3)$$

$$\Delta\text{clad} = [(ncl10 - ng)/ncl10] \times 100 \; (\%) \quad (4)$$

In the nonlinear optical fiber 10, the ratio of the outer diameter of the buffer core layer 14 with respect to the diameter of the center core region 11, i.e., d14/d11, is equal to or larger than 1.2 and equal to or smaller than 2.0. The value of Δ11 is equal to or larger than 1.8%, and more preferably, equal to or larger than 2.2%. The ratio of the outer diameter of the core layer 12 with respect to the diameter of the center core region 11, i.e., d12/d11, is equal to or larger than 2.5, and more preferably, equal to or larger than 3.0. The value of Δ12 is equal to or larger than −1.2% and equal to or smaller than −0.2%, and more preferably, equal to or larger than −1.2% and equal to or smaller than −0.4%. The value of Δ14 is equal to or larger than 0.1% and equal to or smaller than 0.6%, and more preferably, equal to or larger than 0.3% and equal to or smaller than 0.6%.

The center core region 11 and the buffer core layer 14 have so-called α-type refractive index profiles with α values of α11 and α14, respectively. The α value is an index representing the shape of the refractive index, which is defined by Equations (5) and (6). As the α value increases, the center portion of the refractive index profile of the core becomes round, i.e., it shifts from a triangular shape to a rectangular shape.

$$n^2(r) = nc11^2\{1 - 2(\Delta 11/100) \cdot (2r/d11)^{\wedge}\alpha 11\} \quad (5)$$

where $0 \leq r < d11/2$.

$$n^2(r) = nc14^2\{1 - 2(\Delta 14/100) \cdot ((r - r14\max)/(d14/2 - r14\max))^{\wedge}\alpha 14\} \quad (6)$$

where $r14\max \leq r < d14/2$.

In the Equations (5) and (6), r is a position from the center of the optical fiber in the radial direction. The parameter r14max is a position from the center of the optical fiber in the radial direction at a point where the relative refractive index difference with respect to the cladding 16 has the maximum value in the range of $d11/2 \leq r < d14/2$, and when r14max is not at a single point but exists across a wide range, its center point is taken. In FIG. 2, r14max=d11/2. n(r) is the refractive index at the point r, and the symbol "^" is a symbol representing an exponential.

As for the transmission characteristics of the nonlinear optical fiber 10, the cutoff wavelength is set to be shorter than 1500 nm in order to transmit a signal light of a wavelength equal to or longer than 1500 nm in single mode. Because the variation range of zero dispersion wavelength in the longitudinal direction is equal to or narrower than 30 nm per a length of 1 km, and the variation range of wavelength dispersion in the longitudinal direction at the wavelength of 1550 nm is equal to or smaller than 1 ps/nm/km per a length of 1 km, the wavelength dispersion characteristic is kept stable even when the length of the optical fiber is increased, so that the nonlinear optical phenomena can be used with high efficiency. Furthermore, because the absolute value of the wavelength dispersion at the wavelength of 1550 nm is equal to or smaller than 5 ps/nm/km, and more preferably, equal to or smaller than 1 ps/nm/km, the generation efficiency of the nonlinear optical phenomena such as the FWM is high. Moreover, because the variation of the wavelength dispersion at the wavelength of 1550 nm when the outer diameter of the core layer 12 is changed by 1% is equal to or smaller than 0.7 ps/nm/km in a range where the absolute value of the wavelength dispersion at the wavelength of 1550 nm is equal to or smaller than 5 ps/nm/km, the optical fiber has a small absolute value of the wavelength dispersion in the longitudinal direction with stability. In addition, because the absolute value of the wavelength dispersion slope at the wavelength of 1550 nm is equal to or larger than 0.02 ps/nm²/km and equal to or smaller than 0.06 ps/nm²/km, the optical fiber has a small absolute value of the wavelength dispersion across a broad wavelength bandwidth. Furthermore, because the transmission loss at the wavelength of 1550 nm is equal to or smaller than 1.5 dB/km, the optical loss is small and the generation efficiency of the nonlinear optical phenomena is high. Moreover, because the polarization mode dispersion at the wavelength of 1550 nm is equal to or smaller than 0.2 ps/km$^{1/2}$, even when the signal light is a short optical pulse, the degradation of the pulse waveform is suppressed during propagating through the optical fiber. In addition, the nonlinear coefficient at the wavelength of 1550 nm is equal to or larger than $40 \times 10^{-10}$/W, the generation efficiency of the nonlinear optical phenomena is high.

In the specification, the cutoff wavelength ($\lambda_c$) means the fiber cutoff wavelength defined in the ITU-T (International Telecommunication Union Telecommunication Standardization Sector) G. 650.1. Other terminologies not specifically defined in the specification comply with the definitions and the measurement methods in the ITU-T G. 650.1. In addition, the nonlinear coefficient ($n_2/A_{eff}$) used in the specification is a value measured by the XPM method.

The characteristics of the nonlinear optical fiber 10 according to the first embodiment will be explained with a simulation result. The first thing to be explained is a relationship between the refractive index profile of the nonlinear optical fiber and wavelength dispersion stability in the longitudinal direction. The wavelength dispersion stability in the longitudinal direction means how much the wavelength dispersion changes when the diameter of the core changes in the longitudinal direction, and it can be estimated by a change of the wavelength dispersion with respect to a change of the diameter of the core.

Regarding the nonlinear optical fiber 10 having the refractive index profile shown in FIG. 2, a change of the wavelength dispersion with the change of the diameter of the core 15 is calculated by simulation from the electric field distribution of a propagating light. In this simulation, the diameter of the core 15 is changed by changing the outer diameter d12 of the core layer 12 while fixing Ra11 and Ra12, which are the ratio of the diameter d11 of the center core region 11 to the outer diameter d12 of the core layer 12 and the ratio of the outer diameter d14 of the buffer core layer 14 to the outer diameter d12 of the core layer 12, respectively.

The change of the wavelength dispersion when the outer diameter d12 of the core layer 12 is changed by 1%, ΔD [ps/nm/km], is defined by Equation (7).

$$\Delta D = ((D_{+1} - D_{-1})/(d12_{+1} - d12_{-1})) \times d12/100 \quad (7)$$

In Equation (7), $D_{+1}$ represents wavelength dispersion when the outer diameter of the core layer 12 is $d12_{+1}$ and $D_{-1}$ represents wavelength dispersion when the outer diameter of the core layer 12 is $d12_{-1}$, where $d12_{+1} = d12 + \delta$ and $d12_{-1} = d12 - \delta$. The parameter δ is a change amount of the outer diameter of the core layer 12.

FIG. 3 is a table of a result of calculating wavelength dispersion change ΔD, wavelength dispersion slope S, effective core area $A_{eff}$, and cutoff wavelength $\lambda_c$ when the outer diameter d12 of the core layer 12 is changed by 1% near a point where wavelength dispersion D is 0 ps/nm/km, with the profile parameters used in the simulation set as Ra11=0.20, Δ11=3.0, α11=3, Ra12=0.25, Δ14=0.3, α14=6, and Δ12=−0.6. As shown in FIG. 3, the absolute value of the wavelength dispersion D is minimized when the outer diameter d12 of the core layer 12 is 20.6 μm, and at this time, the wavelength dispersion change ΔD is 0.52 [(ps/nm/km) %], which is a small enough value compared to a value of a conventional nonlinear optical fiber that will be described later.

FIG. 4 is a table of a result of calculating the wavelength dispersion change $\Delta D$, the wavelength dispersion slope S, the effective core area $A_{eff}$, and the cutoff wavelength $\lambda_c$ when the outer diameter d12 of the core layer 12 is changed by 1% near a point where the wavelength dispersion D is 0 ps/nm/km, with the profile parameters used in the simulation set as Ra11=0.40, $\Delta 11$=3.0, $\alpha 11$=3, Ra12=0.55, $\Delta 14$=0.3, $\alpha 14$=6, and $\Delta 12$=−0.6. As shown in FIG. 4, the absolute value of the wavelength dispersion D is minimized when the outer diameter d12 of the core layer 12 is 10.6 µm, and at this time, the wavelength dispersion change $\Delta D$ is 0.47 [(ps/nm/km) %], which is a small enough value compared to the value of the conventional nonlinear optical fiber that will be described later.

Subsequently, regarding the nonlinear optical fiber 10 having the refractive index profile shown in FIG. 2, the wavelength dispersion change $\Delta D$ is calculated from the wavelength dispersion at each diameter by changing the diameter of the core with a step of 0.1 µm using various profile parameters, and wavelength dispersion change $\Delta D_0$ at a diameter with which the absolute value of the wavelength dispersion is minimized is compared for each case.

FIGS. 5 to 9 are tables of a result of comparing values of the wavelength dispersion change $\Delta D_0$ when Ra11 and Ra12 are changed with parameters other than the Ra11 and the Ra12 fixed. FIGS. 5 to 7 show cases where $\Delta 11$ is set to 3.0, 2.4, and 1.8, respectively; and FIGS. 8 and 9 show cases where $\Delta 12$ is different from the case shown in FIG. 6. FIG. 10 is a table of a result of a case where $\Delta 14$ is changed in the case shown in FIG. 5. The results show that $\Delta D_0$ is changed depending on a ratio of Ra12 and Ra11, i.e., the ratio d14/d11 of the outer diameter d14 of the buffer core layer 14 and the diameter d11 of the center core region 11, and in a range where d14/d11 is equal to or smaller than 2.0, $\Delta D_0$ decreases as d14/d11 increases.

However, because there is a tradeoff relationship between d14/d11 and the cutoff wavelength, i.e., the cutoff wavelength increases as d14/d11 increases, it is necessary to increase d14/d11 in a range where the cutoff wavelength is shorter than a wavelength of a signal light. In addition, because there is a tradeoff relationship between d14/d11 and the effective core area, i.e., the effective core area increases as d14/d11 increases, to maintain the high nonlinearity, it is necessary to increase d14/d11 in a range where the effective core area is equal to or smaller than 18 µm². On the other hand, if d14/d11 is smaller than 1.2, the wavelength dispersion characteristics of the optical fiber does not become stable in the longitudinal direction because $\Delta D_0$ does not decrease that much.

However, in the nonlinear optical fiber 10 according to the first embodiment, d14/d11 is equal to or larger than 1.2 and equal to or smaller than 2.0; and therefore, $\Delta D_0$ is small enough and the wavelength dispersion characteristics are stable in the longitudinal direction, the cutoff wavelength becomes short, and the effective core area is equal to or smaller than 18 µm², which leads to a high nonlinearity.

In addition that there is a tradeoff relationship between d14/d11 and the cutoff wavelength, i.e., the cutoff wavelength increases as d14/d11 increases, there is another tradeoff relationship between $\Delta 11$ or $\Delta 12$ and the cutoff wavelength, i.e., the cutoff wavelength increases as $\Delta 11$ or $\Delta 12$ increases. Therefore, it is necessary to increase d14/d11 in a range where the cutoff wavelength becomes shorter than the wavelength of the signal light with respect to predetermined $\Delta 11$ and $\Delta 12$. For example, when $\Delta 11$ is 3.0% and $\Delta 12$ is −0.6%, if d14/d11 is larger than 1.4, the cutoff wavelength becomes equal to or longer than 1500 nm; and therefore, it is preferable to set d14/d11 to equal to or larger than 1.2 and equal to or smaller than 1.4.

Furthermore, because there is a tradeoff relationship between $\Delta 11$ or Ra11 and $\Delta D_0$, i.e., $\Delta D_0$ increases as $\Delta 11$ decreases or Ra11 increases, it is necessary to increase d14/d11 in a range where $\Delta D_0$ becomes small enough with respect to predetermined $\Delta 11$ and Ra11. For example, when $\Delta 11$ is 2.4%, $\Delta 12$ is −0.6%, and Ra11 is 0.4, the cutoff wavelength becomes equal to or longer than 1500 nm if d14/d11 is larger than 1.7, and $\Delta D_0$ becomes larger than 0.7 [(ps/nm/km) %] if d14/d11 is smaller than 1.3. Therefore, it is preferable to set d14/d11 to equal to or larger than 1.3 and equal to or smaller than 1.7.

If $\Delta 11$ is smaller than 1.8%, not only $\Delta D_0$ increase but also it is difficult to keep the effective core area to equal to or smaller than 18 µm². However, in the nonlinear optical fiber 10 according to the first embodiment, because $\Delta 11$ is equal to or larger than 1.8%, $\Delta D_0$ is small enough and the wavelength dispersion characteristics become stable in the longitudinal direction of the optical fiber. Furthermore, the effective core area can be easily set to equal to or smaller than 18 µm², it is possible to maintain the high nonlinearity. In addition, in the nonlinear optical fiber 10 according to the first embodiment, because $\Delta 11$ is preferably equal to or larger than 2.2%, the effective core area can be set to equal to or smaller than 15 µm², and it is possible to maintain even higher nonlinearity, which makes it possible to increase the generation efficiency of the nonlinear optical phenomena.

If Ra11, i.e., d11/d12, is larger than 0.4, not only $\Delta D_0$ increases but also the effective core area increases. However, in the nonlinear optical fiber 10 according to the first embodiment, because d12/d11 is equal to or larger than 2.5, and more preferably, equal to or larger than 3.0, Ra11 becomes equal to or smaller than 0.4; and therefore, $\Delta D_0$ is small enough and the wavelength dispersion characteristics become stable in the longitudinal direction of the optical fiber. Furthermore, the effective core area can be kept small, so that it is possible to maintain the high nonlinearity.

In addition, if $\Delta 12$ increases, not only the cutoff wavelength increases but also the effective core area increases. When $\Delta 12$ is larger than −0.2%, it is difficult to keep the cutoff wavelength shorter than 1500 nm. Furthermore, it is difficult to set $\Delta 12$ to smaller than −1.2% in manufacturing the optical fiber. However, in the nonlinear optical fiber 10 according to the first embodiment, because $\Delta 12$ is equal to or larger than −1.2% and equal to or smaller than −0.2%, and more preferably, equal to or larger than −1.2% and equal to or smaller than −0.4%, the cutoff wavelength can be easily set to shorter than 1500 nm, the fabrication becomes easy, too. Moreover, the effective core area can be kept small, so that it is possible to maintain the high nonlinearity.

Although $\Delta D_0$ decreases as $\Delta 14$ increases, if $\Delta 14$ becomes larger than 0.6%, an air bubble is apt to be generated in the buffer core layer 14 at the time of manufacturing the optical fiber, which degrades the productivity. On the other hand, if $\Delta 14$ is smaller than 0.1%, the effect of reducing $\Delta D_0$ by the buffer core layer 14 cannot be obtained. However, in the nonlinear optical fiber 10 according to the first embodiment, $\Delta 14$ is equal to or larger than 0.1% and equal to or smaller than 0.6%, and more preferably, equal to or larger than 0.3% and equal to or smaller than 0.6%, a high productivity can be achieved and the effect of reducing $\Delta D_0$ can be obtained significantly.

Figure 11:
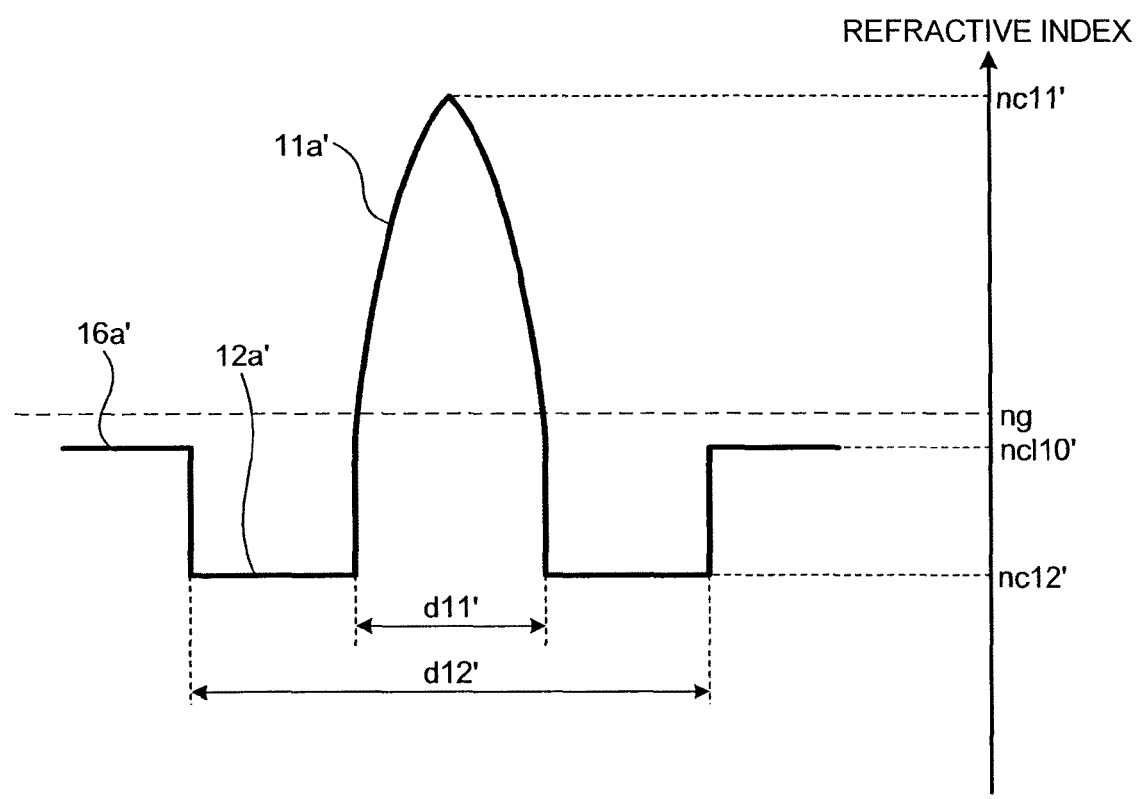
FIG. 11 is a schematic diagram of the refractive index profile of a conventional-type nonlinear optical fiber.

For comparison, a change of wavelength dispersion is calculated by simulation from electric field distribution of a light in a conventional-type nonlinear optical fiber that does not have a buffer core layer near a point where the wavelength dispersion D is 0 ps/nm/km when the outer diameter of the core layer is changed. As shown in FIG. 11, the conventional-type nonlinear optical fiber includes a core and a cladding: the core includes a center core region that has a diameter d11', an α-type refractive index profile 11a' and a maximum refractive index nc11' and a core layer that is formed around the center core region and that has a refractive index lower than a refractive index of the center core region, an outer diameter d12', a refractive index profile 12a', and a minimum refractive index nc12'; and the cladding is formed around the core layer, having a refractive index lower than the refractive index of the center core region and higher than the refractive index of the core layer, a refractive index profile 16a' and a refractive index nc10'. In the simulation, the diameter of the core is changed by changing the outer diameter d12' of the core layer, while fixing Ra11', which is a ratio of the diameter d11' of the center core region (also referred to as "a center core") to the outer diameter d12' of the core layer (also referred to as "a depressed core").

FIG. 12 is a table of a result of calculating the wavelength dispersion change ΔD, the wavelength dispersion slope S, the effective core area $A_{eff}$, and the cutoff wavelength $\lambda_c$ when the outer diameter d12' of the core layer is changed by 1% near a point where the wavelength dispersion D is 0 ps/nm/km, with the profile parameters used in the simulation set as Ra11'=0.20, Δ11'=3.0, α11'=3, and Δ12'=−0.6 as in the same manner as the case shown in FIG. 3. As shown in FIG. 12, the absolute value of the wavelength dispersion D is minimized when the outer diameter d12' of the core layer is 21.1 μm, and at this time, the wavelength dispersion change ΔD is 0.68 [(ps/nm/km) %]. This value is larger than 0.52 [(ps/nm/km) %] that is the value of ΔD in the nonlinear optical fiber 10 according to the first embodiment including the buffer core layer 14 shown in FIG. 3.

FIG. 13 is a table of a result of calculating the wavelength dispersion change ΔD, the wavelength dispersion slope S, the effective core area $A_{eff}$, and the cutoff wavelength $\lambda_c$ when the outer diameter d12' of the core layer is changed by 1% near a point where the wavelength dispersion D is 0 ps/nm/km, with the profile parameters used in the simulation set as Ra11'=0.40, Δ11'=3.0, α11'=3, and Δ12'=−0.6 as in the same manner as the case shown in FIG. 4. As shown in FIG. 13, the absolute value of the wavelength dispersion D is minimized when the outer diameter d12' of the core layer is 10.6 μm, and at this time, the wavelength dispersion change ΔD is 0.70 [(ps/nm/km) %]. This value is larger than 0.47 [(ps/nm/km) %] that is the value of ΔD in the nonlinear optical fiber 10 according to the first embodiment including the buffer core layer 14 shown in FIG. 4.

From the above description, with the nonlinear optical fiber 10 according to the first embodiment, even when the diameter of the core varies in the longitudinal direction of the optical fiber due to a fluctuation of the manufacturing conditions at the time of manufacturing the nonlinear optical fiber, a variation of the wavelength dispersion characteristics due to the variation of the diameter of the core in the longitudinal direction can be reduced because the nonlinear optical fiber includes at least one buffer core layer formed between the center core region and the core layer, which has refractive index lower than that of the center core region and higher than that of the core layer. Therefore, it is possible to realize a nonlinear optical fiber having stable wavelength dispersion characteristics in the longitudinal direction so that the nonlinear optical phenomena can be used with high efficiency.

Embodiment examples of the nonlinear optical fiber according to the present invention will be explained in detail below based on an actual measurement result of each characteristic value.

As embodiment examples 1 to 6, nonlinear optical fibers 101 to 106 according to the present invention are fabricated. Each of the nonlinear optical fibers 101 to 106 includes the structure and the refractive index profile shown in FIGS. 1 and 2, and is fabricated using the same core preform having the profile parameters of Ra11=0.22, Δ11=3.0, α11=3.4, Ra12=0.27, Δ14=0.4, α14=3.6, Δ12=−0.6, and Δclad=0. In fabricating the nonlinear optical fiber, the outer diameter d12 of the core layer is changed to change the characteristics such as the wavelength dispersion by changing the outer diameter of the cladding.

FIG. 14 is a table of measured characteristics of the nonlinear optical fibers 101 to 106 according to the embodiment examples 1 to 6. Values of wavelength dispersion, dispersion slope, loss, effective core area, nonlinear coefficient, and polarization mode dispersion in the table indicate values at the wavelength of 1550 nm. Values of effective core area, cutoff wavelength, outer diameter of core layer, outer diameter of cladding, and outer diameter of coating in the table indicate average values of measured values at both facets of fabricated nonlinear optical fibers.

As shown in FIG. 14, the cutoff wavelengths of all of the nonlinear optical fibers 101 to 106 are shorter than 1500 nm. Furthermore, the characteristics of all of the nonlinear optical fibers 101 to 106 at the wavelength of 1550 nm show the absolute value of the wavelength dispersion equal to or smaller than 5 ps/nm/km, the absolute value of the wavelength dispersion slope equal to or larger than 0.02 ps/nm$^2$/km and equal to or smaller than 0.06 ps/nm$^2$/km, the nonlinear coefficient equal to or larger than 40×10$^{-10}$/W, the transmission loss equal to or smaller than 1.5 dB/km, and the polarization mode dispersion equal to or smaller than 0.2 ps/km$^{1/2}$. In addition, the outer diameters of the claddings of the nonlinear optical fibers 103 to 106 are equal to or smaller than 100 μm with the outer diameters of the coatings equal to or smaller than 150 μm.

Upon calculating the wavelength dispersion change ΔD when the outer diameter of the core layer is changed by 1% from the relationship between the outer diameter of the core layer and the wavelength dispersion of the nonlinear optical fibers 101 to 106 using Equation (7), the values are equal to or smaller than 0.7 [(ps/nm/km) %] in all the optical fibers.

Figure 16:
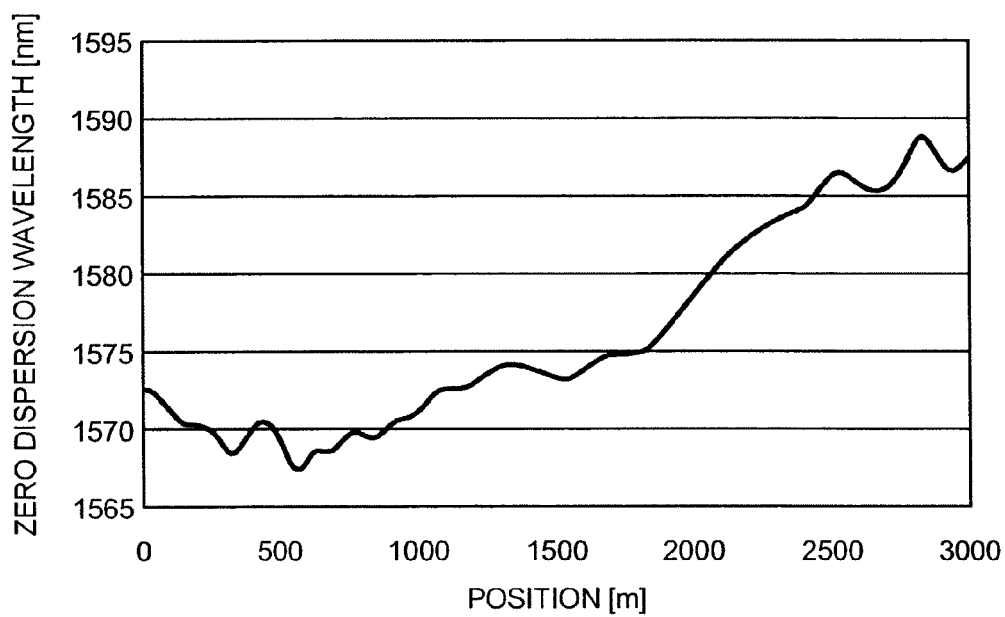
FIG. 16 is a graph showing a result of measuring variation of zero dispersion wavelength in the longitudinal direction of the nonlinear optical fiber, where the horizontal axis represents position from a facet of the optical fiber and the vertical axis represents zero dispersion wavelength.

Subsequently, for the nonlinear optical fiber 106 according to the embodiment example 6, a variation of the wavelength dispersion in the longitudinal direction of the optical fiber is measured by a nonlinear OTDR method that is disclosed in Optics Letters, vol. 21, pp. 1724-1726 (1996). The fiber length is set to 3 km, and the measurement wavelength is set to 1550 nm. FIG. 15 is a graph showing a result of measuring the variation of the wavelength dispersion in the longitudinal direction of the nonlinear optical fiber 106, where the horizontal axis represents position from a facet of the optical fiber and the vertical axis represents wavelength dispersion. As shown in FIG. 15, the variation range of the wavelength dispersion in the longitudinal direction of the optical fiber at the wavelength of 1550 nm is equal to or smaller than 0.6 ps/nm/km per a length of 1 km at the largest. In addition, a variation of the zero dispersion wavelength in the longitudinal direction of the optical fiber is calculated from the measurement result shown in FIG. 15. FIG. 16 is a graph showing a result of measuring the variation of the zero dispersion wavelength in the longitudinal direction of the nonlinear optical fiber 106, where the horizontal axis represents position from a facet of the optical fiber and the vertical axis represents zero dispersion wavelength. As shown in FIG. 16, the variation range of the zero dispersion wavelength in the longitudinal direction of the optical fiber is equal to or smaller than 15 nm per a length of 1 km at the largest.

A nonlinear optical fiber according to a second embodiment of the present invention will be explained next. The nonlinear optical fiber according to the second embodiment is different from the nonlinear optical fiber according to the first embodiment in that the core further includes an additional core layer that is formed between the core layer and the cladding and that has a refractive index higher than the refractive index of the cladding.

Figure 17:
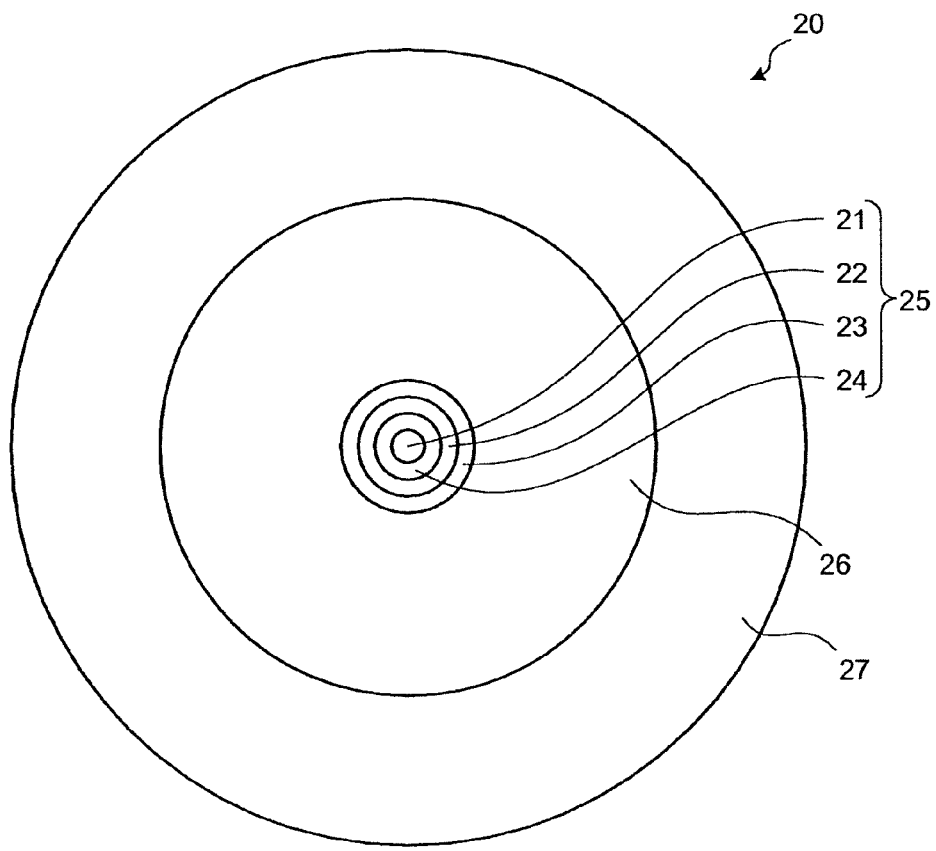
FIG. 17 is a schematic diagram of the cross section of a nonlinear optical fiber according to a second embodiment of the present invention.
Figure 18:
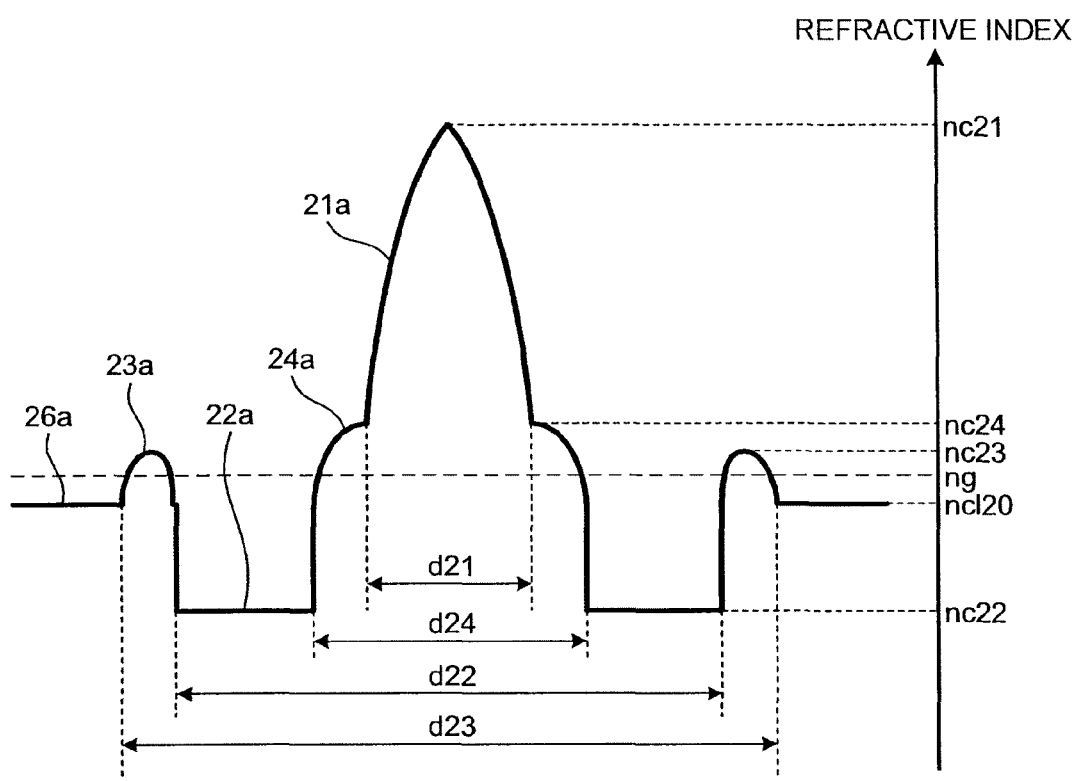
FIG. 18 is a schematic diagram of the refractive index profile of the nonlinear optical fiber according to the second embodiment of the present invention.

FIG. 17 is a schematic diagram of the cross section of a nonlinear optical fiber 20 according to the second embodiment; and FIG. 18 is a schematic diagram of the refractive index profile of the nonlinear optical fiber 20. As shown in FIGS. 17 and 18, the nonlinear optical fiber 20 according to the second embodiment has the same structure as the nonlinear optical fiber 10 according to the first embodiment, except for that a core 25 further includes an additional core layer 23 that is formed between a core layer 22 and a cladding 26 and that has a refractive index higher than a refractive index of the cladding 26 and an outer diameter d23.

Furthermore, as shown in FIG. 18, although the nonlinear optical fiber 20 has a refractive index profile that is similar to the refractive index profile of the nonlinear optical fiber 10 according to the first embodiment, the additional core layer 23 has the outer diameter d23 and a refractive index profile 23a with a maximum refractive index nc23.

In the similar manner as the nonlinear optical fiber 10 according to the first embodiment, a ratio d21/d22 is defined as Ra21, and a ratio d24/d22 is defined as Ra22, the maximum relative refractive index difference between a center core region 21 and the cladding 26 is defined as $\Delta 21$, the minimum relative refractive index difference between the core layer 22 and the cladding 26 is defined as $\Delta 22$, and the maximum relative refractive index difference between a buffer core layer 24 and the cladding 26 is defined as $\Delta 24$. In addition, a ratio d23/d22 of the outer diameter d23 of the additional core layer 23 to the outer diameter d22 of the core layer 22 is defined as Ra23, and the maximum relative refractive index difference between the additional core layer 23 and the cladding 26 is defined as $\Delta 23$.

Regarding $\Delta 21$, $\Delta 22$, and $\Delta 24$, equations similar to Equations (1) to (3) can be applied in the similar manner to $\Delta 11$, $\Delta 12$, and $\Delta 14$. In addition, $\Delta 23$ is expressed by Equation (8).

$$\Delta 23 = [(n23 - ncl20)/nc23] \times 100\ (\%) \quad (8)$$

In the nonlinear optical fiber 20, d24/d21 is equal to or larger than 1.2 and equal to or smaller than 2.0 as the nonlinear optical fiber 10. In addition, $\Delta 21$ is equal to or larger than 1.8%, and more preferably, equal to or larger than 2.2%. Furthermore, d22/d21 is equal to or larger than 2.5, and more preferably, equal to or larger than 3.0. Moreover, $\Delta 22$ is equal to or larger than −1.2% and equal to or smaller than −0.2%, and more preferably, equal to or larger than −1.2% and equal to or smaller than −0.4%. In addition, $\Delta 24$ is equal to or larger than 0.1% and equal to or smaller than 0.6%, and more preferably, equal to or larger than 0.3% and equal to or smaller than 0.6%. Ra23, i.e., d23/d22, is equal to or smaller than 1.2, and $\Delta 23$ is equal to or smaller than 0.3%. Therefore, because the area of the additional core layer is small, the cutoff wavelength can easily be set to a predetermined wavelength shorter than the signal light wavelength.

As for the transmission characteristic of the nonlinear optical fiber 20, the cutoff wavelength is set to be shorter than 1500 nm in order to transmit a signal light of a wavelength equal to or longer than 1500 nm in single mode in the same manner as the nonlinear optical fiber 10. The variation range of zero dispersion wavelength in the longitudinal direction is equal to or narrower than 30 nm per a length of 1 km. Furthermore, at the wavelength of 1550 nm, the variation range of wavelength dispersion in the longitudinal direction is equal to or smaller than 1 ps/nm/km per a length of 1 km, the absolute value of the wavelength dispersion is equal to or smaller than 5 ps/nm/km, and more preferably, equal to or smaller than 1 ps/nm/km. The variation of the wavelength dispersion at the wavelength of 1550 nm when the outer diameter of the core layer 22 is changed by 1% is equal to or smaller than 0.7 ps/nm/km in a range where the absolute value of the wavelength dispersion is equal to or smaller than 5 ps/nm/km. In addition, at the wavelength of 1550 nm, the absolute value of the wavelength dispersion slope is equal to or larger than 0.02 ps/nm$^2$/km and equal to or smaller than 0.06 ps/nm$^2$/km, the transmission loss is equal to or smaller than 1.5 dB/km, and the polarization mode dispersion is equal to or smaller than 0.2 ps/km$^{1/2}$. As for the optical nonlinearity, the nonlinear coefficient at the wavelength of 1550 nm is equal to or larger than $40 \times 10^{-10}$/W.

The characteristics of the nonlinear optical fiber 20 according to the second embodiment will be explained with a simulation result. The first thing to be explained is a relationship between the refractive index profile of the nonlinear optical fiber and wavelength dispersion stability in the longitudinal direction of the optical fiber. A change of the wavelength dispersion with the change of the diameter of the core 25 is calculated by simulation from the electric field distribution of a light propagating through the nonlinear optical fiber 20 having the refractive index profile shown in FIG. 18. In this simulation, the diameter of the core 25 is changed by changing the outer diameter d22 of the core layer 22 while fixing Ra21, Ra22, and Ra23, which are the ratio of the diameter d21 of the center core region 21 to the outer diameter d22 of the core layer 22, the ratio of the outer diameter d24 of the buffer core layer 24 to the outer diameter d22 of the core layer 22, and the ratio of the outer diameter d23 of the additional core layer 23 to the outer diameter d22 of the core layer 22, respectively.

FIG. 19 is a table of a result of calculating the wavelength dispersion change $\Delta D$, the wavelength dispersion slope S, the effective core area $A_{eff}$ and the cutoff wavelength $\lambda_c$ when the outer diameter d22 of the core layer 22 is changed by 1% near a point where the wavelength dispersion D is 0 ps/nm/km, with the profile parameters used in the simulation set as Ra21=0.20, $\Delta 21$=3.0, $\alpha 21$=3, Ra22=0.25, $\Delta 24$=0.4, $\alpha 24$=4, $\Delta 22$=−0.6, Ra23=1.2, and $\Delta 23$=0.2. As shown in FIG. 19, the absolute value of the wavelength dispersion D is minimized when the outer diameter d22 of the core layer 22 is 20.2 μm, and at this time, the wavelength dispersion change $\Delta D$ is 0.53 [(ps/nm/km) %], which is a small enough value compared to the value of the conventional nonlinear optical fiber that will be described later.

FIG. 20 is a table of a result of calculating the wavelength dispersion change $\Delta D$, the wavelength dispersion slope S, the effective core area $A_{eff}$, and the cutoff wavelength $\lambda_c$ when the outer diameter d22 of the core layer 22 is changed by 1% near a point where the wavelength dispersion D is 0 ps/nm/km, with the profile parameters used in the simulation set as Ra21=0.40, $\Delta 21$=3.0, $\alpha 21$=3, Ra22=0.55, $\Delta 24$=0.4, $\alpha 24$=4, $\Delta 22$=−0.6, Ra23=1.2, and $\Delta 23$=0.2. As shown in FIG. 20, the absolute value of the wavelength dispersion D is minimized when the outer diameter d22 of the core layer 22 is 10.4 μm, and at this time, the wavelength dispersion change $\Delta D$ is 0.48

[(ps/nm/km) %], which is a small enough value compared to the value of the conventional nonlinear optical fiber that will be described later.

For comparison, a change of wavelength dispersion is calculated by simulation from electric field distribution of a light in a conventional-type nonlinear optical fiber that does not have a buffer core layer near a point where the wavelength dispersion D is 0 ps/nm/km when the outer diameter of the core layer is changed. As shown in FIG. 21, the conventional-type nonlinear optical fiber has a refractive index profile of the same structure as the conventional-type nonlinear optical fiber shown in FIG. 11, and the core further includes an additional core layer that is formed between the core layer and the cladding and has a refractive index higher than the refractive index of the cladding, an outer diameter d23', a refractive index profile 23a', and a maximum refractive index nc23'. In the simulation, the diameter of the core is changed by changing the outer diameter d22' of the core layer, while fixing Ra21', which is a ratio of the diameter d21' of the center core region to the outer diameter d22' of the core layer and Ra23', which is a ratio of the diameter d23' of the additional core layer to the outer diameter d22' of the core layer.

Figure 22:
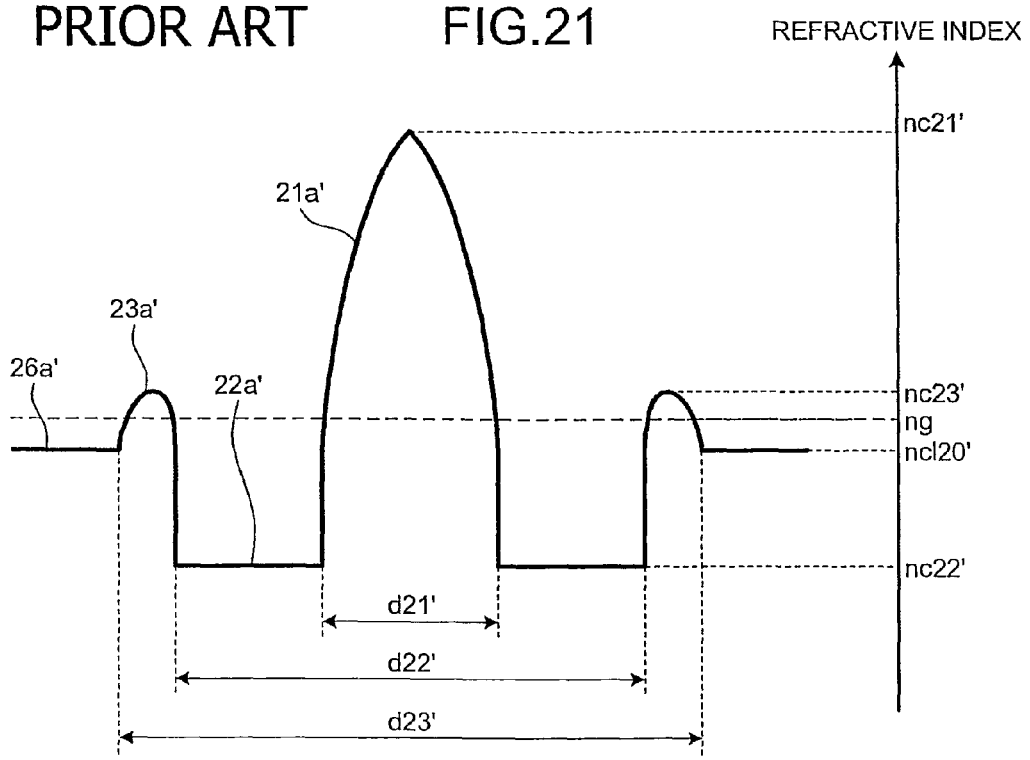
FIG. 22 is a table of a result of calculating wavelength dispersion change ΔD, wavelength dispersion slope S, effective core area $A_{\mathit{eff}}$, and cutoff wavelength $\lambda_c$ when the outer diameter of a core layer is changed by 1% near a point where wavelength dispersion D is 0 ps/nm/km.

FIG. 22 is a table of a result of calculating the wavelength dispersion change ΔD, the wavelength dispersion slope S, the effective core area $A_{eff}$ and the cutoff wavelength $\lambda_c$ when the outer diameter d22' of the core layer is changed by 1% near a point where the wavelength dispersion D is 0 ps/nm/km, with the profile parameters used in the simulation set as Ra21'=0.20, Δ21'=3.0, α21'=3, Δ22'=−0.6, Ra23'=1.2, and Δ23'=0.2 as the case shown in FIG. 19. As shown in FIG. 22, the absolute value of the wavelength dispersion D is minimized when the outer diameter d22' of the core layer is 21.1 μm, and at this time, the wavelength dispersion change ΔD is 0.69 [(ps/nm/km) %]. This value is larger than 0.53 [(ps/nm/km) %] that is the value of ΔD in the nonlinear optical fiber 20 according to the second embodiment including the buffer core layer shown in FIG. 19.

FIG. 23 is a table of a result of calculating the wavelength dispersion change ΔD, the wavelength dispersion slope S, the effective core area $A_{eff}$, and the cutoff wavelength $\lambda_c$ when the outer diameter d22' of the core layer is changed by 1% near a point where the wavelength dispersion D is 0 ps/nm/km, with the profile parameters used in the simulation set as Ra21'=0.40, Δ21'=3.0, α21'=3, Δ22'=−0.6, Ra23'=1.2, and Δ23'=0.2 as the case shown in FIG. 20. As shown in FIG. 23, the absolute value of the wavelength dispersion D is minimized when the outer diameter d22' of the core layer is 10.6 μm, and at this time, the wavelength dispersion change ΔD is 0.71 [(ps/nm/km) %]. This value is larger than 0.48 [(ps/nm/km) %] that is the value of ΔD in the nonlinear optical fiber 20 according to the second embodiment including the buffer core layer 14 shown in FIG. 20.

From the above description, also with the nonlinear optical fiber 20 according to the second embodiment, it is possible to realize a nonlinear optical fiber having stable wavelength dispersion characteristics in the longitudinal direction so that the nonlinear optical phenomena can be used with high efficiency as in the same manner as the nonlinear optical fiber 10 according to the first embodiment.

As embodiment examples 7 to 9, nonlinear optical fibers 201 to 203 according to the present invention are fabricated. Each of the nonlinear optical fibers 201 to 203 includes the structure and the refractive index profile shown in FIGS. 17 and 18, and is fabricated using the same core preform having the profile parameters of Ra21=0.21, Δ21=3.0, α21=3.4, Ra22=0.26, Δ24=0.4, α24=3.6, Δ22=−0.6, Ra23=1.15, Δ23=0.2, and Δclad=0. In fabricating the nonlinear optical fiber, the outer diameter d22 of the core layer is changed to change the characteristics such as the wavelength dispersion by changing the outer diameter of the cladding.

FIG. 24 is a table of measured characteristics of the nonlinear optical fibers 201 to 203 according to the embodiment examples 7 to 9. Values of wavelength dispersion, dispersion slope, loss, effective core area, nonlinear coefficient, and polarization mode dispersion in the table indicate values at the wavelength of 1550 nm. Values of effective core area, cutoff wavelength, outer diameter of core layer, outer diameter of cladding, and outer diameter of coating in the table indicate average values of measured values at both facets of fabricated nonlinear optical fibers.

As shown in FIG. 24, the cutoff wavelengths of all of the nonlinear optical fibers 201 to 203 are shorter than 1500 nm. Furthermore, the characteristics of all of the nonlinear optical fibers 201 to 203 at the wavelength of 1550 nm show the absolute value of the wavelength dispersion equal to or smaller than 5 ps/nm/km, the absolute value of the wavelength dispersion slope equal to or larger than 0.02 ps/n$^{m2}$/km and equal to or smaller than 0.06 ps/nm²/km, the nonlinear coefficient equal to or larger than 40×10$^{−10}$/W, the transmission loss equal to or smaller than 1.5 dB/km, and the polarization mode dispersion equal to or smaller than 0.2 ps/km$^{1/2}$.

Upon calculating the wavelength dispersion change ΔD when the outer diameter of the core layer is changed by 1% from the relationship between the outer diameter of the core layer and the wavelength dispersion of the nonlinear optical fibers 201 to 203 using Equation (7), the values are equal to or smaller than 0.7 [(ps/nm/km) %] in all the optical fibers.

Figure 25:
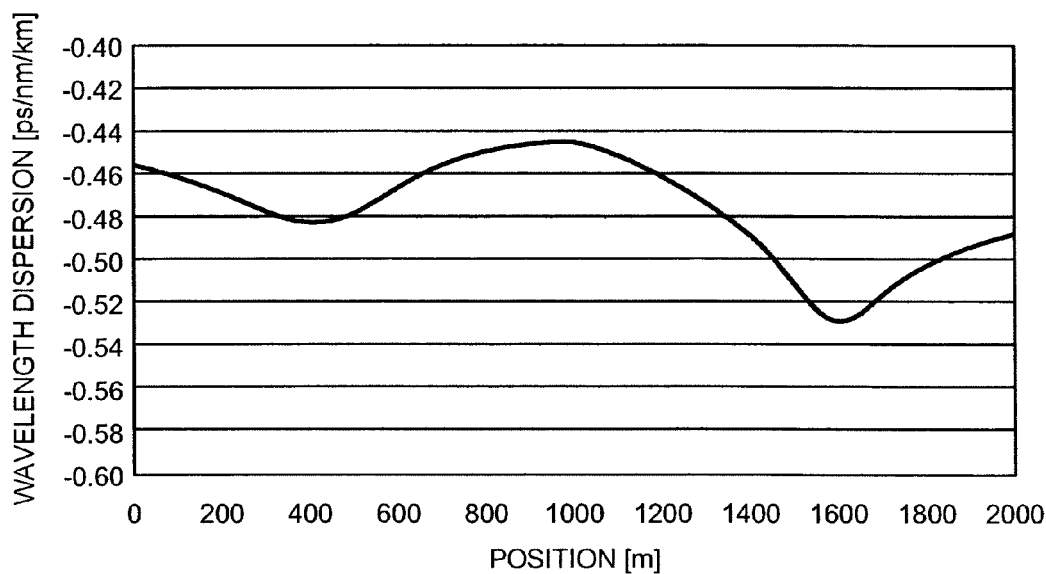
FIG. 25 is a graph showing a result of measuring variation of wavelength dispersion in the longitudinal direction of the nonlinear optical fiber, where the horizontal axis represents position from a facet of the optical fiber and the vertical axis represents wavelength dispersion.
Figure 26:
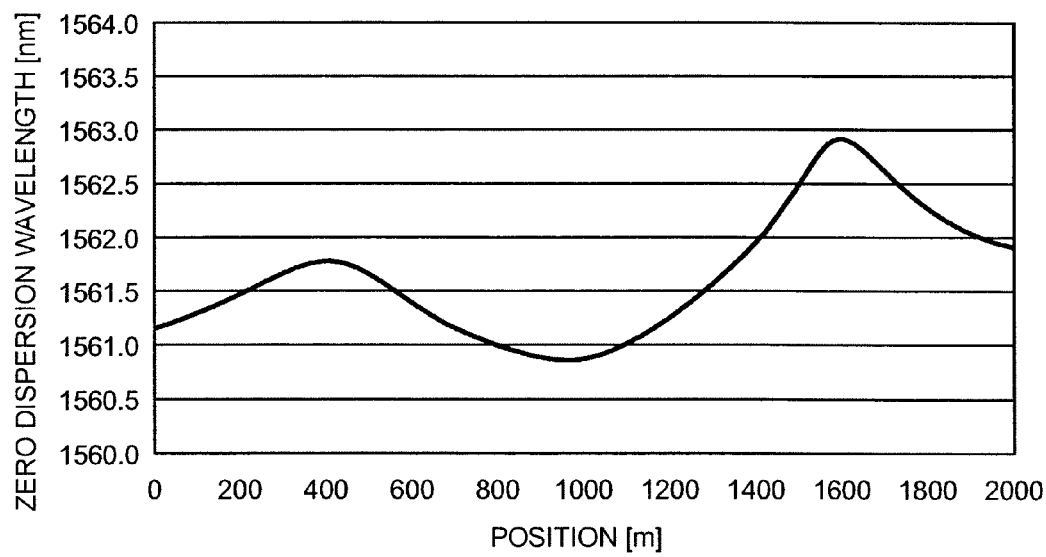
FIG. 26 is a graph showing a result of measuring variation of zero dispersion wavelength in the longitudinal direction of the nonlinear optical fiber, where the horizontal axis represents position from a facet of the optical fiber and the vertical axis represents zero dispersion wavelength.

Subsequently, for the nonlinear optical fiber 203 according to the embodiment example 9, a variation of the wavelength dispersion in the longitudinal direction of the optical fiber is measured by the nonlinear OTDR method that is described earlier. The fiber length is set to 2 km, and the measurement wavelength is set to 1550 nm. FIG. 25 is a graph showing a result of measuring the variation of the wavelength dispersion in the longitudinal direction of the nonlinear optical fiber 203, where the horizontal axis represents position from a facet of the optical fiber and the vertical axis represents wavelength dispersion. As shown in FIG. 25, the variation range of the wavelength dispersion in the longitudinal direction of the optical fiber at the wavelength of 1550 nm is equal to or smaller than 0.1 ps/nm/km per a length of 1 km at the largest. In addition, a variation of the zero dispersion wavelength in the longitudinal direction of the optical fiber is calculated from the measurement result shown in FIG. 25. FIG. 26 is a graph showing a result of measuring the variation of the zero dispersion wavelength in the longitudinal direction of the nonlinear optical fiber 203, where the horizontal axis represents position from a facet of the optical fiber and the vertical axis represents zero dispersion wavelength. As shown in FIG. 26, the variation range of the zero dispersion wavelength in the longitudinal direction of the optical fiber is equal to or smaller than 2.5 nm per a length of 1 km at the largest.

A nonlinear optical device according to a third embodiment of the present invention will be explained next. The nonlinear optical fiber according to the third embodiment is different from the nonlinear optical fiber according to the second embodiment in that a stress applying member is provided on both sides of the cladding across the center core region.

Figure 27:
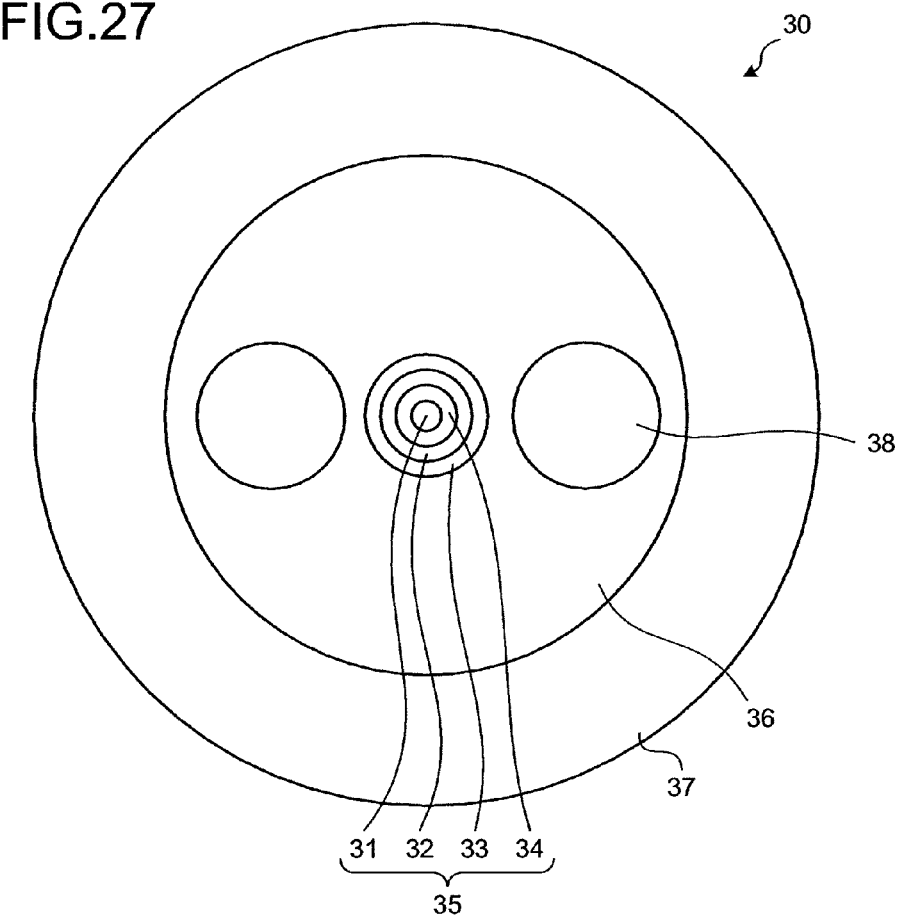
FIG. 27 is a schematic diagram of the cross section of a nonlinear optical fiber according to a third embodiment of the present invention.
Figure 28:
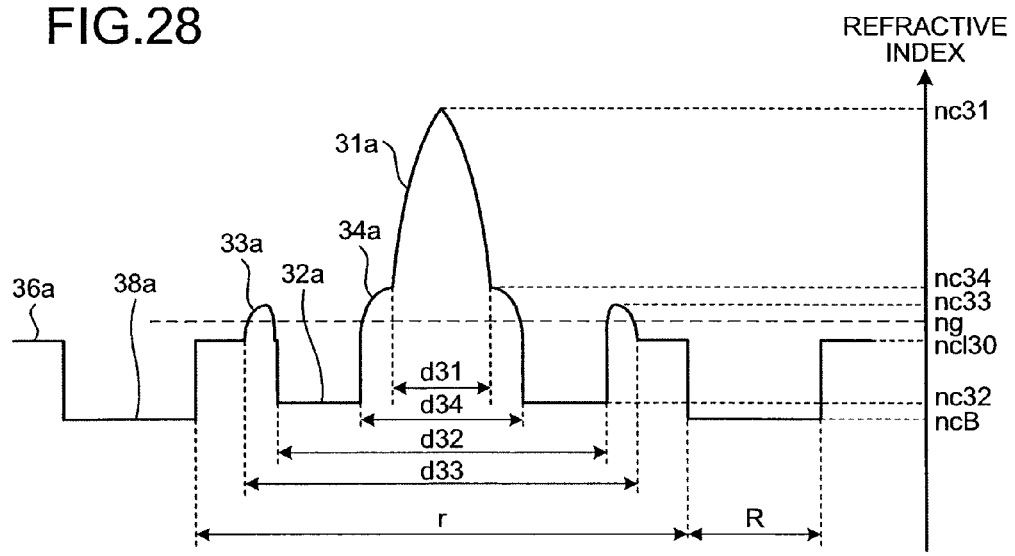
FIG. 28 is a schematic diagram of the refractive index profile of the nonlinear optical fiber according to the third embodiment of the present invention.

FIG. 27 is a schematic diagram of the cross section of a nonlinear optical fiber 30 according to the third embodiment of the present invention; and FIG. 28 is a schematic diagram of the refractive index profile of the nonlinear optical fiber 30. As shown in FIGS. 27 and 28, the nonlinear optical fiber 30 according to the third embodiment has the same structure as the nonlinear optical fiber 20 according to the second embodiment, except for that a stress applying member (stress applying preform) 38 having a diameter R is provided with a distance r on both sides of a cladding 36 across a center core region 31. With the stress applying member 38 provided, a stress is applied to a core 35 in a direction in which the stress applying member 38 is provided, so that the nonlinear optical fiber 30 becomes a polarization maintaining optical fiber.

The stress applying member 38 is formed with boron-doped silica glass. Because the boron-doped silica glass has a larger thermal expansion coefficient compared with the pure silica glass, a tensile stress occurs in the stress applying member 38 when drawing the optical fiber preform to fabricate the optical fiber. Therefore, a stress is applied to the core 35 in the direction in which the stress applying member 38 is provided by the tensile stress.

When the minimum or the maximum relative refractive index difference of the stress applying member 38 with respect to the cladding 36 is ΔB, ΔB is defined by Equation (9) using a refractive ncl30 of the cladding 36 and a minimum or a maximum refractive index ncB of the stress applying member 38.

$$\Delta B = [ncB - ncl30]/ncB \times 100\ (\%) \tag{9}$$

If ΔB is larger than −0.1% and smaller than 0.1%, it is hard to recognize optically the position of the stress applying member 38 because the refractive index difference between the stress applying member 38 and the cladding 36 is too small. When connecting the nonlinear optical fiber 30 according to the third embodiment to other polarization maintaining optical fiber having a stress applying member, it is necessary to match the positions of the stress applying members of the optical fibers to transmit the signal light while maintaining the state of polarization. From this standpoint, in order to recognize optically the position of the stress applying member 38 with ease when connecting with the other optical fiber, the nonlinear optical fiber 30 according to the third embodiment has ΔB equal to or smaller than −0.1% or equal to or larger than 0.1%, and more preferably, equal to or larger than −0.8% and equal to or smaller than −0.2%.

In addition, because the nonlinear optical fiber 30 has a polarization crosstalk at the wavelength of 1550 nm equal to or smaller than −20 dB per a distance of 100 m, it shows good polarization maintaining characteristic.

As embodiment examples 10 to 12, nonlinear optical fibers 301 to 303 according to the present invention are fabricated. Each of the nonlinear optical fibers 301 to 303 includes the structure and the refractive index profile shown in FIGS. 27 and 28, and is fabricated using the same core preform having the profile parameters of Ra31=0.37, Δ31=3.0, α31=3.4, Ra32=0.46, Δ34=0.4, α34=3.6, Δ32=−0.6, Ra33=1.21, Δ33=0.2, and Δclad=0. In fabricating the nonlinear optical fiber, the outer diameter d32 of the core is changed to change the characteristics such as the wavelength dispersion by changing the outer diameter of the cladding.

FIG. 29 is a table of measured characteristics of the nonlinear optical fibers 301 to 303 according to the embodiment examples 10 to 12. Values of wavelength dispersion, dispersion slope, loss, effective core area, nonlinear coefficient, and polarization mode dispersion in the table indicate values at the wavelength of 1550 nm. The crosstalk is a value converted from the measured value into a value per a distance of 100 m. Values of effective core area, cutoff wavelength, outer diameter of core layer, outer diameter of cladding, and outer diameter of coating in the table indicate average values of measured values at both facets of fabricated nonlinear optical fibers.

As shown in FIG. 29, the cutoff wavelengths of all of the nonlinear optical fibers 301 to 303 are shorter than 1500 nm. Furthermore, the characteristics of all of the nonlinear optical fibers 301 to 303 at the wavelength of 1550 nm show the absolute value of the wavelength dispersion equal to or smaller than 5 ps/nm/km, the absolute value of the wavelength dispersion slope equal to or larger than 0.02 ps/nm/km and equal to or smaller than 0.06 ps/nm²/km, the nonlinear coefficient equal to or larger than $40 \times 10^{-10}$/W, the transmission loss equal to or smaller than 1.5 dB/km, and the polarization crosstalk is equal to or smaller than −20 dB per a distance of 100 m.

Upon calculating the wavelength dispersion change ΔD when the outer diameter of the core layer is changed by 1% from the relationship between the outer diameter of the core layer and the wavelength dispersion of the nonlinear optical fibers 301 to 303 using Equation (7), the values are equal to or smaller than 0.7 [(ps/nm/km) %] in all the optical fibers.

Subsequently, for the nonlinear optical fiber 303 according to the embodiment example 12, a variation of the wavelength dispersion in the longitudinal direction of the optical fiber is measured by the nonlinear OTDR method that is described earlier. The fiber length is set to 1 km, and the measurement wavelength is set to 1550 nm. FIG. 30 is a graph showing a result of measuring the variation of the wavelength dispersion in the longitudinal direction of the nonlinear optical fiber 303, where the horizontal axis represents position from a facet of the optical fiber and the vertical axis represents wavelength dispersion. As shown in FIG. 30, the variation range of the wavelength dispersion in the longitudinal direction of the optical fiber at the wavelength of 1550 nm is equal to or smaller than 0.13 ps/nm/km per a length of 1 km at the largest.

Figure 31:
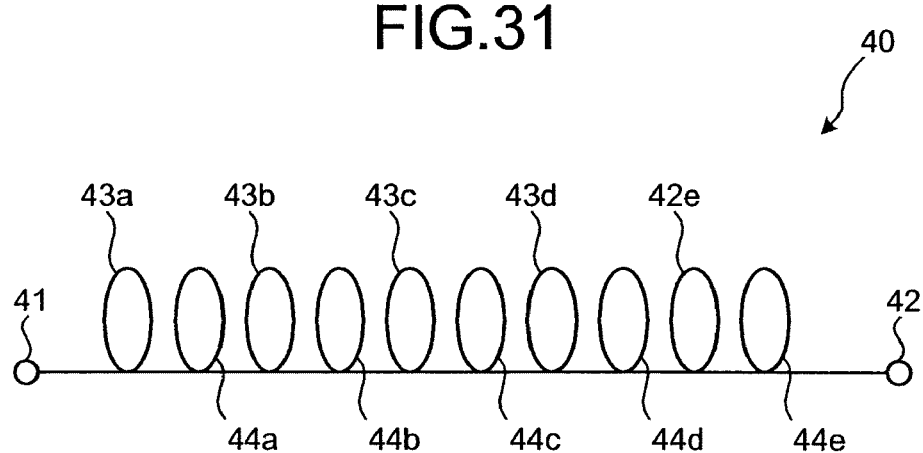
FIG. 31 is a schematic diagram of a nonlinear optical device according to a fourth embodiment of the present invention.

A nonlinear optical device according to a fourth embodiment of the present invention will be explained next. FIG. 31 is a schematic diagram of a nonlinear optical device 40 according to the fourth embodiment of the present invention. The nonlinear optical device 40 according to the fourth embodiment is a waveform shaping device as the one disclosed in Japanese Patent Application Laid-open Publication No. 2004-117590, and includes a light input unit 41, a light output unit 42, and nonlinear optical fibers 43a to 43e according to the present invention installed between the light input unit 41 and the light output unit 42. The nonlinear optical fibers 43a to 43e cause the SPM by an optical pulse input from the light input unit 41 to convert the optical pulse to a soliton, and output a waveform-shaped soliton light to the light output unit 42. In addition, optical fibers 44a to 44e having low optical nonlinearity, which are used in an ordinary optical transmission line, are installed alternately with the nonlinear optical fibers 43a to 43e. Lengths of the optical fibers are adjusted to balance the nonlinearity and the wavelength dispersion, so that a waveform shaping function using the soliton conversion is realized. Because the nonlinear optical device 40 employs the nonlinear optical fibers 43a to 43e according to the present invention, which have stable wavelength dispersion characteristic in the longitudinal direction of the optical fiber, the SPM is generated efficiently; and therefore, the waveform shaping can be performed with high efficiency even if the length of the nonlinear optical fiber is short.

Figure 32:
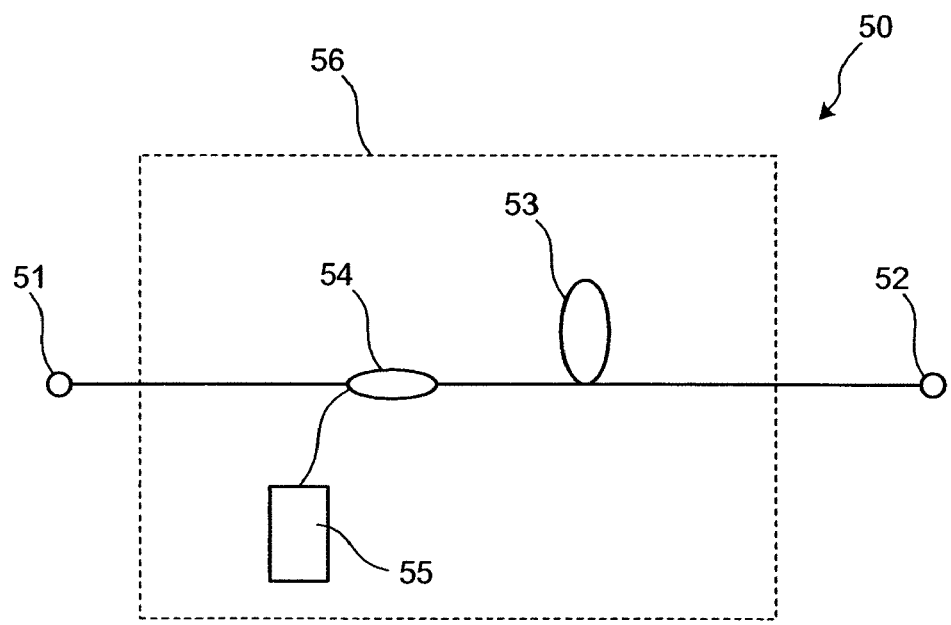
FIG. 32 is a schematic diagram of an optical signal processing apparatus according to a fifth embodiment of the present invention.

An optical signal processing apparatus according to a fifth embodiment of the present invention will be explained next. FIG. 32 is a schematic diagram of an optical signal processing apparatus 50 according to the fifth embodiment of the present invention. The optical signal processing apparatus 50 according to the fifth embodiment is a wavelength converting apparatus as the one disclosed in Japanese Patent Application Laid-open Publication No. 2005-301009, and includes an optical signal input unit 51, an optical signal processing unit 56, and an optical signal output unit 52. The optical signal processing unit 56 includes a nonlinear optical fiber 53 according to the present invention, a pumping light source 55 that outputs a pumping light, and an optical coupler 54 that combines the pumping light and a signal light and input the coupled light to the nonlinear optical fiber. The signal light input from the optical signal input unit 51 is input to the optical signal processing unit 56. In the optical signal processing unit 56, the signal light is combined with the pumping light by the optical coupler 54, and the combined light is input to the nonlinear optical fiber 53. The wavelength of the signal light is converted to a different wavelength by the FWM generated in the nonlinear optical fiber 53 by the pumping light, and the wavelength-converted signal light is output from the optical signal output unit 52. Because the optical signal processing apparatus 50 employs the nonlinear optical fiber 53 according to the present invention, which have stable wavelength dispersion characteristic in the longitudinal direction of the optical fiber, it can perform the wavelength conversion with high efficiency even if the length of the nonlinear optical fiber is short.

Although the nonlinear optical fibers according to the first to the third embodiments includes single buffer core layers 14 to 34, respectively, two or more buffer core layers can be formed in each optical fiber. In addition, although the center core region and the buffer core layer have the α-type refractive index profiles in the description, the step-index-type refractive index profiles can also be used instead.

As described above, according to an aspect of the present invention, even when the diameter of the core varies in the longitudinal direction of the optical fiber due to a fluctuation of the manufacturing conditions at the time of manufacturing the nonlinear optical fiber, a variation of the wavelength dispersion characteristics due to the variation of the diameter of the core in the longitudinal direction can be reduced because the nonlinear optical fiber includes at least one buffer core layer formed between the center core region and the core layer, which has refractive index lower than that of the center core region and higher than that of the core layer. Therefore, it is possible to realize a nonlinear optical fiber having stable wavelength dispersion characteristics in the longitudinal direction so that the nonlinear optical phenomena can be used with high efficiency.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A nonlinear optical fiber comprising:
 a core including
  a center core region,
  a core layer that is formed around the center core region and that has a refractive index lower than a refractive index of the center core region, and
  at least one buffer core layer that is formed between the center core region and the core layer and that has a refractive index lower than a minimum refractive index of the center core region and higher than the refractive index of the core layer; and
 a cladding that is formed around the core layer and that has a refractive index lower than the refractive index of the center core region and higher than the refractive index of the core layer, wherein
 an effective core area at a wavelength of 1550 nanometers is equal to or smaller than 18 $\mu m^2$,
 a ratio of an outer diameter of the buffer core layer to a diameter of the center core region is equal to or larger than 1.2 and equal to or smaller than 2.0, and
 a relative refractive index difference between the buffer core layer and the cladding is equal to or larger than 0.1% and equal to or smaller than 0.6%.

2. The nonlinear optical fiber according to claim 1, wherein the core further includes an additional core layer that is formed between the core layer and the cladding and that has a refractive index higher than the refractive index of the cladding.

3. The nonlinear optical fiber according to claim 1, wherein a relative refractive index difference between the center core region and the cladding is equal to or larger than 1.8%.

4. The nonlinear optical fiber according to claim 1, wherein a ratio of an outer diameter of the core layer to a diameter of the center core region is equal to or larger than 2.5.

5. The nonlinear optical fiber according to claim 1, wherein a relative refractive index difference between the core layer and the cladding is equal to or larger than −1.2% and equal to or smaller than −0.2%.

6. The nonlinear optical fiber according to claim 1, wherein a transmission loss at the wavelength of 1550 nanometers is equal to or smaller than 1.5 dB/km.

7. The nonlinear optical fiber according to claim 1, wherein an outer diameter of the cladding is equal to or smaller than 100 micrometers.

8. The nonlinear optical fiber according to claim 1, further comprising a coating formed around the cladding, wherein
 an outer diameter of the coating is equal to or smaller than 150 micrometers.

9. A nonlinear optical device comprising:
 an optical input unit that inputs a light;
 an optical output unit that outputs a light; and
 a nonlinear optical fiber provided between the optical input unit and the optical output unit, wherein
  the nonlinear optical fiber includes
   a core including
    a center core region,
    a core layer that is formed around the center core region and that has a refractive index lower than a refractive index of the center core region, and
    at least one buffer core layer that is formed between the center core region and the core layer and that has a refractive index lower than a minimum refractive index of the center core region and higher than the refractive index of the core layer, and
   a cladding that is formed around the core layer and that has a refractive index lower than the refractive index of the center core region and higher than the refractive index of the core layer,
  an effective core area at a wavelength of 1550 nanometers is equal to or smaller than 18 $\mu m^2$,
  a ratio of an outer diameter of the buffer core layer to a diameter of the center core region is equal to or larger than 1.2 and equal to or smaller than 2.0,
  a relative refractive index difference between the buffer core layer and the cladding is equal to or larger than 0.1% and equal to or smaller than 0.6%, and the nonlinear optical fiber causes a nonlinear optical phenomenon to be generated by the light input from the optical input unit and outputting a light obtained by the nonlinear optical phenomenon to the optical output unit.

10. An optical signal processing apparatus comprising:
an optical signal input unit that inputs an optical signal;
an optical signal processing unit that includes a nonlinear optical fiber, and performs a signal processing of the optical signal input from the optical signal input unit by using a nonlinear optical phenomenon generated in the nonlinear optical fiber; and
an optical signal output unit that outputs the optical signal that is signal processed, wherein
the nonlinear optical fiber includes
a core including
a center core region,
a core layer that is formed around the center core region and that has a refractive index lower than a refractive index of the center core region, and
at least one buffer core layer that is formed between the center core region and the core layer and that has a refractive index lower than a minimum refractive index of the center core region and higher than the refractive index of the core layer, and
a cladding that is formed around the core layer and that has a refractive index lower than the refractive index of the center core region and higher than the refractive index of the core layer,
an effective core area at a wavelength of 1550 nanometers is equal to or smaller than 18 $\mu m^2$,
a ratio of an outer diameter of the buffer core layer to a diameter of the center core region is equal to or larger than 1.2 and equal to or smaller than 2.0, and
a relative refractive index difference between the buffer core layer and the cladding is equal to or larger than 0.1% and equal to or smaller than 0.6%.

* * * * *